United States Patent
Eppolito et al.

(10) Patent No.: US 9,240,215 B2
(45) Date of Patent: Jan. 19, 2016

(54) EDITING OPERATIONS FACILITATED BY METADATA

(75) Inventors: Aaron M. Eppolito, Santa Cruz, CA (US); Brian Meaney, Livermore, CA (US); Colleen Pendergast, Livermore, CA (US); Michaelle Stikich, El Cerrito, CA (US)

(73) Assignee: APPLE INC., Cupertino, CA (US)

( * ) Notice: Subject to any disclaimer, the term of this patent is extended or adjusted under 35 U.S.C. 154(b) by 708 days.

(21) Appl. No.: 13/250,853

(22) Filed: Sep. 30, 2011

(65) Prior Publication Data

US 2013/0073959 A1    Mar. 21, 2013

Related U.S. Application Data

(60) Provisional application No. 61/537,041, filed on Sep. 20, 2011, provisional application No. 61/537,567, filed on Sep. 21, 2011.

(51) Int. Cl.
| G06F 17/24 | (2006.01) |
| G11B 27/034 | (2006.01) |
| G11B 27/34 | (2006.01) |
| G11B 27/32 | (2006.01) |

(52) U.S. Cl.
CPC ............ *G11B 27/034* (2013.01); *G11B 27/322* (2013.01); *G11B 27/34* (2013.01)

(58) Field of Classification Search
CPC .............. G06F 17/30017; G06F 17/24; G06F 17/30038; G06F 17/30044; G06F 17/30056; G06F 17/3082; G11B 27/034; G11B 27/34; G11B 37/322
USPC ......... 715/203–203, 230, 231, 234, 277, 716, 715/717, 730, 731
See application file for complete search history.

(56) References Cited

U.S. PATENT DOCUMENTS

| 5,659,539 | A | | 8/1997 | Porter et al. |
| 5,659,792 | A | | 8/1997 | Walmsley |
| 5,664,216 | A | | 9/1997 | Blumenau |
| 5,682,326 | A | | 10/1997 | Klingler et al. |
| 5,752,029 | A | | 5/1998 | Wissner |
| 5,781,188 | A | * | 7/1998 | Amiot et al. ................. 715/723 |

(Continued)

FOREIGN PATENT DOCUMENTS

| WO | 2009/026159 | 2/2009 |
| WO | 2009/114134 | 9/2009 |
| WO | 2010/106586 | 9/2010 |

OTHER PUBLICATIONS

U.S. Appl. No. 13/115,966, filed May 25, 2011, Pendergast et al.
U.S. Appl. No. 13/115,970, filed May 25, 2011, Agnoli et al.
U.S. Appl. No. 13/115,973, filed May 25, 2011, Pendergast et al.
U.S. Appl. No. 13/250,855, filed Sep. 30, 2011, Eppolito.
U.S. Appl. No. 13/250,857, filed Sep. 30, 2011, Eppolito et al.
U.S. Appl. No. 13/400,539, filed Feb. 20, 2012, Agnoli et al.

(Continued)

*Primary Examiner* — Wilson Tsui
(74) *Attorney, Agent, or Firm* — ADELI LLP

(57) ABSTRACT

Some embodiments provide a media editing application that uses metadata or metadata tags associated with media content to facilitate editing operations. In some embodiments, the editing operations are performed on the media content at various different stages of the editing process in order to create a composite presentation. In creating the composite presentation, one or more effects are associated with a metadata tag. Once the effects are associated, the media editing application applies the effects to different pieces of media content tagged with the metadata tag in order to create the composite presentation.

20 Claims, 25 Drawing Sheets

(56) References Cited

U.S. PATENT DOCUMENTS

| | | | |
|---|---|---|---|
| 6,134,380 A | 10/2000 | Kushizaki | |
| 6,144,375 A | 11/2000 | Jain et al. | |
| 6,154,600 A | 11/2000 | Newman et al. | |
| 6,154,601 A | 11/2000 | Yaegashi et al. | |
| 6,161,115 A | 12/2000 | Ohanian | |
| 6,366,296 B1 | 4/2002 | Boreczky et al. | |
| 6,476,826 B1 | 11/2002 | Plotkin et al. | |
| 6,539,163 B1 | 3/2003 | Sheasby et al. | |
| 6,629,104 B1 | 9/2003 | Parulski et al. | |
| 6,650,826 B1 | 11/2003 | Hatta | |
| 6,674,955 B2 | 1/2004 | Matsui et al. | |
| 6,741,996 B1 | 5/2004 | Brechner et al. | |
| 6,970,859 B1 | 11/2005 | Brechner et al. | |
| 7,035,463 B1 | 4/2006 | Monobe et al. | |
| 7,313,755 B2 | 12/2007 | Rahman et al. | |
| 7,325,199 B1 | 1/2008 | Reid | |
| 7,362,946 B1 | 4/2008 | Kowald | |
| 7,432,940 B2 | 10/2008 | Brook et al. | |
| 7,539,659 B2 | 5/2009 | Wong et al. | |
| 7,561,160 B2 | 7/2009 | Fukuya | |
| 7,606,444 B1 | 10/2009 | Erol et al. | |
| 7,668,869 B2 | 2/2010 | Weinberger et al. | |
| 7,710,439 B2 | 5/2010 | Reid et al. | |
| RE41,493 E | 8/2010 | Marcus | |
| 7,779,358 B1 | 8/2010 | Gupta et al. | |
| 7,889,946 B1 | 2/2011 | Bourdev | |
| 7,925,669 B2 | 4/2011 | Freeborg et al. | |
| 7,975,062 B2 | 7/2011 | Krikorian et al. | |
| 8,566,721 B2 | 10/2013 | Langmacher et al. | |
| 8,612,858 B2 | 12/2013 | Meaney et al. | |
| 8,745,499 B2 | 6/2014 | Pendergast et al. | |
| 2001/0036356 A1 | 11/2001 | Weaver et al. | |
| 2002/0023103 A1 | 2/2002 | Gagne | |
| 2002/0069218 A1 | 6/2002 | Sull et al. | |
| 2004/0027369 A1 | 2/2004 | Kellock et al. | |
| 2004/0046804 A1 | 3/2004 | Chang | |
| 2004/0078761 A1 | 4/2004 | Ohanian | |
| 2004/0201609 A1 | 10/2004 | Obrador | |
| 2004/0212637 A1 | 10/2004 | Varghese | |
| 2004/0215643 A1 | 10/2004 | Brechner et al. | |
| 2004/0268224 A1 | 12/2004 | Balkus et al. | |
| 2005/0120127 A1 | 6/2005 | Bradley et al. | |
| 2005/0132293 A1 | 6/2005 | Herberger et al. | |
| 2006/0008247 A1 | 1/2006 | Minami et al. | |
| 2006/0078288 A1 | 4/2006 | Huang et al. | |
| 2006/0136556 A1 | 6/2006 | Stevens et al. | |
| 2006/0155684 A1 | 7/2006 | Liu et al. | |
| 2006/0161867 A1 | 7/2006 | Drucker et al. | |
| 2006/0233514 A1 | 10/2006 | Weng et al. | |
| 2006/0236256 A1* | 10/2006 | Helie et al. | 715/769 |
| 2006/0242164 A1 | 10/2006 | Evans et al. | |
| 2007/0079321 A1 | 4/2007 | Ott | |
| 2007/0124282 A1 | 5/2007 | Wittkotter | |
| 2007/0136656 A1 | 6/2007 | Nydam et al. | |
| 2007/0154190 A1 | 7/2007 | Gilley et al. | |
| 2007/0204238 A1 | 8/2007 | Hua et al. | |
| 2007/0240072 A1 | 10/2007 | Cunningham et al. | |
| 2007/0266304 A1 | 11/2007 | Fletcher et al. | |
| 2007/0296734 A1* | 12/2007 | Ekpar | 345/619 |
| 2008/0126191 A1 | 5/2008 | Schiavi | |
| 2008/0155459 A1 | 6/2008 | Ubillos | |
| 2008/0184121 A1 | 7/2008 | Kulas | |
| 2008/0222170 A1 | 9/2008 | Farnham et al. | |
| 2008/0306921 A1 | 12/2008 | Rothmuller et al. | |
| 2009/0006475 A1 | 1/2009 | Udezue et al. | |
| 2009/0031239 A1 | 1/2009 | Coleran et al. | |
| 2009/0089690 A1 | 4/2009 | Chi et al. | |
| 2009/0100339 A1 | 4/2009 | Wharton-Ali et al. | |
| 2009/0150947 A1 | 6/2009 | Soderstrom | |
| 2009/0182644 A1 | 7/2009 | Panagopulos et al. | |
| 2009/0201316 A1 | 8/2009 | Bhatt et al. | |
| 2009/0249185 A1 | 10/2009 | Datar et al. | |
| 2009/0259623 A1 | 10/2009 | Mooneyham et al. | |
| 2010/0063961 A1 | 3/2010 | Guiheneuf et al. | |
| 2010/0080528 A1 | 4/2010 | Yen et al. | |
| 2010/0082585 A1 | 4/2010 | Barsook et al. | |
| 2010/0153520 A1* | 6/2010 | Daun et al. | 709/218 |
| 2010/0158471 A1 | 6/2010 | Ogikubo | |
| 2010/0194763 A1 | 8/2010 | Niles et al. | |
| 2010/0275123 A1 | 10/2010 | Yu et al. | |
| 2010/0281366 A1 | 11/2010 | Langmacher et al. | |
| 2010/0281371 A1 | 11/2010 | Warner et al. | |
| 2010/0281377 A1 | 11/2010 | Meaney et al. | |
| 2010/0281378 A1 | 11/2010 | Pendergast et al. | |
| 2010/0333026 A1 | 12/2010 | Hooper et al. | |
| 2011/0010624 A1 | 1/2011 | Vanslette et al. | |
| 2011/0047163 A1 | 2/2011 | Chechik et al. | |
| 2011/0113331 A1 | 5/2011 | Herberger et al. | |
| 2011/0116769 A1 | 5/2011 | Sugiyama et al. | |
| 2011/0161348 A1 | 6/2011 | Oron | |
| 2011/0276881 A1 | 11/2011 | Keng et al. | |
| 2012/0017153 A1 | 1/2012 | Matsuda et al. | |
| 2012/0209889 A1 | 8/2012 | Agnoli et al. | |
| 2012/0210218 A1 | 8/2012 | Pendergast et al. | |
| 2012/0210219 A1 | 8/2012 | Agnoli et al. | |
| 2012/0210220 A1 | 8/2012 | Pendergast et al. | |
| 2013/0073933 A1 | 3/2013 | Eppolito | |
| 2013/0073960 A1 | 3/2013 | Eppolito et al. | |
| 2013/0073961 A1 | 3/2013 | Agnoli et al. | |
| 2013/0073962 A1 | 3/2013 | Pendergast et al. | |
| 2013/0073963 A1 | 3/2013 | Pendergast et al. | |
| 2013/0073964 A1 | 3/2013 | Meaney et al. | |

OTHER PUBLICATIONS

U.S. Appl. No. 13/400,540, filed Feb. 20, 2012, Pendergast et al.
U.S. Appl. No. 13/400,542, filed Feb. 20, 2012, Pendergast et al.
U.S. Appl. No. 13/400,545, filed Feb. 20, 2012, Meaney et al.
Author Unknown, "Apple Announces Final Cut Pro 4," NAB, Apr. 6, 2003, 3 pages, Apple Inc., Las Vegas, NV, USA.
Author Unknown, "Using Adobe Premiere Elements 8 Edirot," last updated Aug. 12, 2010, 313 pages, Adobe Systems Incorporated, San Jose, California, USA.
Author Unknown, "Adobe Premiere Pro CS3: User Guide," Apr. 1, 2008, 455 pages, Adobe Systems Incorporated, San Jose, California, USA.
Author Unknown, "iMovie '08 Getting Started," Month Unknown, 2008, pp. 1-50, Apple Inc., USA.
Brenneis, Lisa, "Final Cut Pro 3 for Macintosh: Visual QuickPro Guide," Month Unknown, 2002, 288 pages Peachpit Press, Berkeley, California, USA.
Casares, Juan, et al., "Simplifying Video Editing Using Metadata", Processing of Designing Interactive Systems (DIS 2002), Jun. 2002, 10 pages, London, UK, available at http://www.informedia.cs.cmu.edu/documents/silver-dis02-draft.pdf.
Diakopoulos, Nicholas, et al., "Videotater: An Approach for Pen-Based Digital Video Segmentation and Tagging", UIST'06, Oct. 15-18, 2006, 4 pages, Montreux, Switzerland, available at http://www.deakondesign.com/Documents/tn151-diakopoulos.pdf.
Kutics, Andrea, et al., "Use of Adaptive Still Image Descriptors for Annotation of Video Frames", Lecture Notes in Computer Science, Month Unknown, 2007, pp. 686-697, vol. 4633, Springer-Verlag, Berlin, Heidelberg.
Myers, Brad A., et al., "A Multi-View Intelligent Editor for Digital Video Libraries", The First ACM+IEEE Joint Conference on Digital Libraries (JCDL'01), Jun. 24-28, 2001, 10 pages, Roanoke, VA, available at http://www.informedia.cs.cmu.edu/documents/dl2001paper.pdf.
Shaw, Ryan, et al., "Toward Emergent Representations for Video", Proceedings of the 13th annual ACM International Conference on Multimedia, Nov. 6-11, 2005, 4 pages, Singapore.
Ulges, Adrian, et al., "Content-based Video Tagging for Online Video Portals", Proceedings of the 3rd MUSCLE/Image CLEF Workshop on Image and Video Retrieval Evaluation, Sep. 2007, 10 pages, Budapest, Hungary.
Wang, et al. "MyVideos—A System for Home Video Management", Proceedings of the 10th ACM International Conference on Multimedia '02, Dec. 1-6, 2002, pp. 412-413, Juan-les-Pins, France.

* cited by examiner

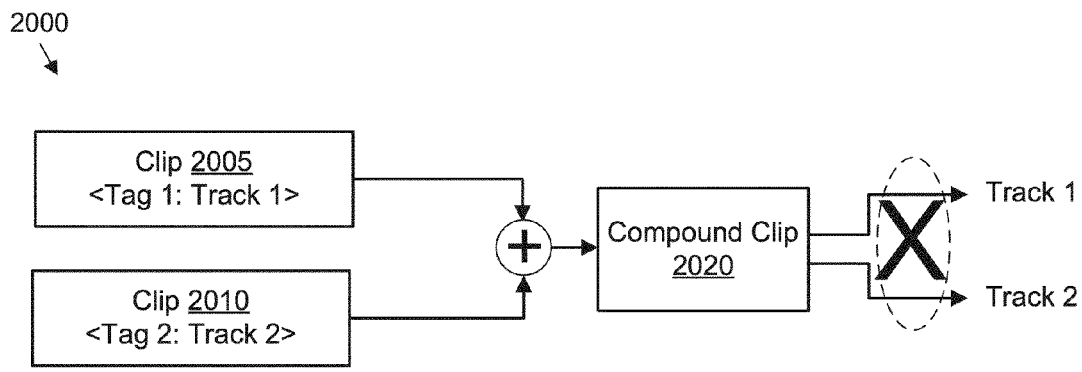
*Figure 20A*
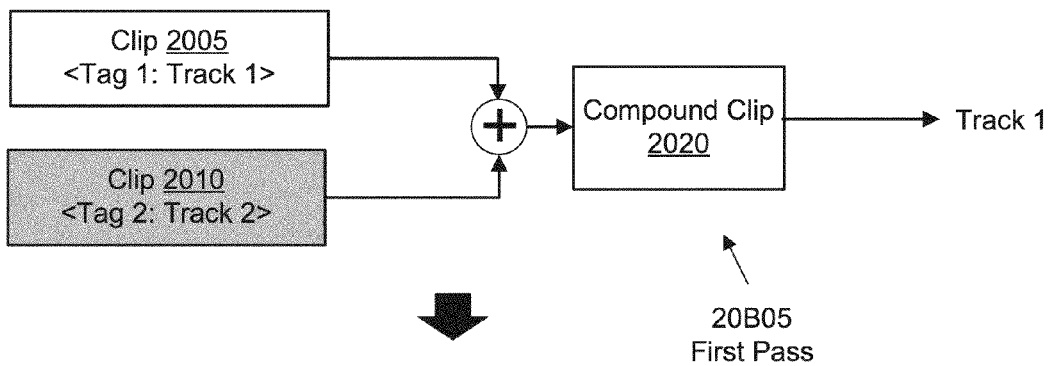
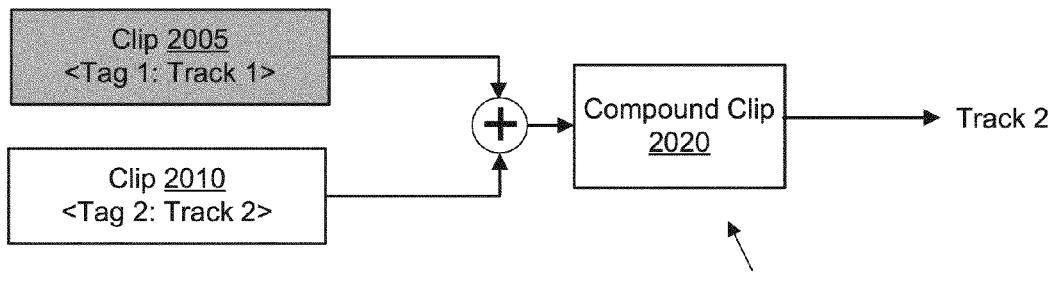
*Figure 20B*

EDITING OPERATIONS FACILITATED BY METADATA

CLAIM OF BENEFIT TO PRIOR APPLICATIONS

This application claims the benefit of U.S. Provisional Application 61/537,041, filed Sep. 20, 2011, and U.S. Provisional Application 61/537,567, filed Sep. 21, 2011. U.S. Provisional Application 61/537,041 and U.S. Provisional Application 61/537,567 are incorporated herein by reference.

BACKGROUND

To date, many media editing applications exist for creating a composite media presentation by compositing several pieces of media content such as video, audio, animation, still image, etc. In some cases, a media editing application combines a composite of two or more clips with one or more other clips to output (e.g., play, export) the composite presentation.

There are a number of different problems that can occur when outputting such a composite presentation. For example, some movie studios require a particular content (e.g., dialog content, music content) of a composite presentation to be separate from other content. The content separation allows the movie studios to easily replace the composite presentation's dialog in one language with a dialog in another language. The problem with providing separate content is that, once several pieces of media content are mixed as one mixed content, the mixed content cannot be un-mixed to provide the separate content.

As another example, displaying the audio levels of different media clips during playback of a composite presentation is useful as the audio levels indicate how much audio one or more of the different media clips are contributing to the overall mix. The problem with this is similar to the example described above. That is, a mix of the different media clips cannot be un-mixed during playback to provide metering information for the different media clips.

In addition, some media editing applications apply one or more different effects (e.g., reverb effect, echo effect, blur effect, distort effect, etc.) to a set of clips when outputting a composite presentation. Several of these effects are applied using a "send" (i.e., "send and return") that entails routing audio signals of different clips over an auxiliary ("aux") bus to an effects unit. For a typical media editing application, a "send" effect is applied with the user manually adding an input aux track, specifying an effect for the aux track, specifying an input bus for the aux track, creating the "send", and identifying the specified bus to route the audio signals of different clips. In this manner, several audio signals of different clips can be routed over one aux bus in order to apply a same effect (e.g., an echo effect) to a combined audio signal of the different clips. However, the "send" technique becomes increasingly complicated as additional aux buses are added to route audio signals of multiple different clips.

Furthermore, several of the media editing applications described above allow users to view metadata associated with media content and/or perform organizing operations using the metadata. However, these media editing applications lack the tools or the functionality to perform different editing operations by using one or more pieces of metadata that is associated with the media content.

The concepts described in this section have not necessarily been previously conceived, or implemented in any prior approach. Therefore, unless otherwise indicated, it should not be assumed that any concepts described in this section qualify as prior art merely by virtue of their inclusion in this section.

BRIEF SUMMARY

Some embodiments provide a media editing application that uses metadata or metadata tags associated with media content to facilitate editing operations. In some embodiments, the editing operations are performed on the media content at various different stages of the editing process in order to create a composite presentation. In creating the composite presentation, one or more effects are associated with a metadata tag. Once the effects are associated, the media editing application applies the effects to different pieces of media content tagged with the metadata tag in order to create the composite presentation.

Different embodiments provide different schemes for specifying one or more effects to apply to media content that have been associated with a metadata tag. For instance, in some embodiments, the media editing application allows an effect chain or an effect list to be specified for each type or category of metadata tag. In some embodiments, the media editing application allows its user to specify effect properties for the effects in the effect list. These effect properties define how the corresponding effect is applied to the media content.

Based on metadata associated with different clips, the media editing application of some embodiments applies a set of effects (e.g., echo effect, reverb effect) by using a "send" or a "send and return". In some embodiments, the "send" is performed automatically such that the routing of audio signals of the different clips to an effect module is transparent to the application's user. That is, the user does not have to add an input auxiliary ("aux") track, specify an effect for the aux track, specify an input bus for the aux track, create the "send", and identify the specified bus to route the audio signals of the different clips. Instead, the user can simply specify a particular effect for a metadata tag. The media editing application then applies the particular effect using the "send" to a combined audio signal of each clip tagged with the metadata tag.

The media editing application of some embodiments applies one or more effects directly on each clip without using the "send". One example of such technique is applying an effect as an "insert" effect that processes (e.g., filters, distorts) an incoming audio signal and outputs the processed audio signal. For example, when a metadata tag is associated with a particular effect, the media editing application of some embodiments automatically applies the particular effect to each audio signal of the different clips tagged with the metadata tag.

In some embodiments, when playing a composite presentation, the media editing application displays the audio level of a set of one or more clips that has been mixed with other clips. For example, the audio signals of the set of clips can be mixed with other clips in order to play the composite presentation. To indicate the audio level of the set of clips that has been mixed with other clips, the media editing application of some embodiments routes a combined audio signal of the set of clips over a meter bus in order to determine the audio level of the combined audio signal. In some embodiments, the media editing application scales (i.e., reduces or increases) the audio level of one or more clips by processing down a signal chain or sequence of operations and identifying what one or more of the clips are contributing to the overall mix.

Alternatively, the media editing application of some embodiments extracts metering information from each clip in a set of clips prior to mixing the clips. The metering information is then used to estimate the audio level of one or more clips in the composite presentation. Similar to sending the audio signal over the meter bus, the media editing application of some embodiments scales the estimated audio level by identifying what one or more of the clips are contributing to the overall mix.

In some embodiments, the media editing application allows a composite presentation to be exported to different tracks (e.g., different files). To export the composite presentation, the media editing application of some embodiments performs multiple rendering passes on a sequence of clips while muting one or more of the clips in the sequence. In some such embodiments, the composite presentation is output to different tracks based on metadata associated with the clips. For example, with these metadata tags, a multi-track output can be specified as a first track for each clip tagged as dialog, a second track for each clip tagged as music, etc. In this manner, the editor or a movie studio can easily replace one track with another track.

The media editing application of some embodiments uses metadata to provide user interface controls. In some such embodiments, these controls are used to display properties of tagged clips and/or specify parameters that affect the tagged clips. Example of such user interface controls include audio meters, volume controls, different controls for modifying (e.g., distorting, blurring, changing color) images, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 20A illustrates the problem with outputting a composite presentation to different tracks.

FIG. 20B illustrates outputting a composite presentation to different audio files, in some embodiments.

DETAILED DESCRIPTION

Figure 1:
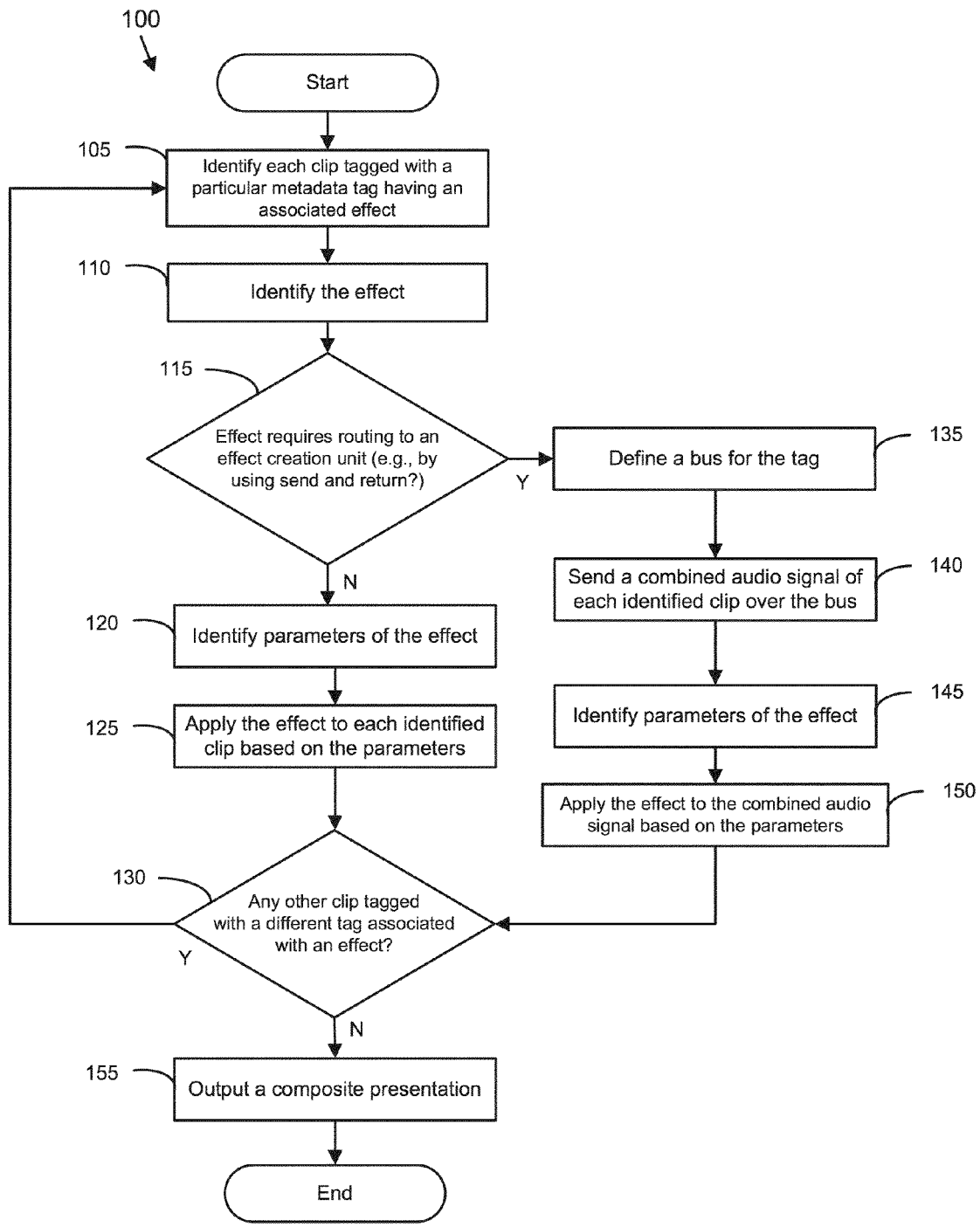
FIG. 1 conceptually illustrates a process that some embodiments use to apply effects.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a media editing application that uses metadata or metadata tags associated with media content to facilitate editing operations. In some embodiments, the editing operations are performed on the media content at various different stages of the editing process in order to create a composite presentation. In creating the composite presentation, one or more effects are associated with a metadata tag. Once the effects are associated, the media editing application applies the effects to different pieces of media content tagged with the metadata tag in order to create the composite presentation.

Different embodiments provide different schemes for specifying one or more effects to apply to media content that have been associated with a metadata tag. For instance, in some embodiments, the media editing application allows an effect chain or an effect list to be specified for each type or category of metadata tag. In some embodiments, the media editing application allows its user to specify effect properties for the effects in the effect list. These effect properties define how the corresponding effect is applied to the media content.

Based on metadata associated with different clips, the media editing application of some embodiments applies a set of effects (e.g., echo effect, reverb effect) by using a "send" or a "send and return". In some embodiments, the "send" is performed automatically such that the routing of audio signals of the different clips to an effect module is transparent to the application's user. That is, the user does not have to add an input auxiliary ("aux") track, specify an effect for the aux track, specify an input bus for the aux track, create the "send", and identify the specified bus to route the audio signals of the different clips. Instead, the user can simply specify a particular effect for a metadata tag. The media editing application then applies the particular effect using the "send" to a combined audio signal of each clip tagged with the metadata tag.

The media editing application of some embodiments applies one or more effects directly on each clip without using the "send". One example of such technique is applying an effect as an "insert" effect that processes (e.g., filters, distorts) an incoming audio signal and outputs the processed audio signal. For example, when a metadata tag is associated with a particular effect, the media editing application of some embodiments automatically applies the particular effect to each audio signal of the different clips tagged with the metadata tag.

In some embodiments, when playing a composite presentation, the media editing application displays the audio level of a set of one or more clips that has been mixed with other clips. For example, the audio signals of the set of clips can be mixed with other clips in order to play the composite presentation. To indicate the audio level of the set of clips that has been mixed with other clips, the media editing application of some embodiments routes a combined audio signal of the set of clips over a meter bus in order to determine the audio level of the combined audio signal. In some embodiments, the media editing application scales (i.e., reduces or increases) the audio level of one or more clips by processing down a signal chain or sequence of operations and identifying what one or more of the clips are contributing to the overall mix.

Alternatively, the media editing application of some embodiments extracts metering information from each clip in a set of clips prior to mixing the clips. The metering information is then used to estimate the audio level of one or more clips in the composite presentation. Similar to sending the audio signal over the meter bus, the media editing application of some embodiments scales the estimated audio level by identifying what one or more of the clips are contributing to the overall mix.

In some embodiments, the media editing application allows a composite presentation to be exported to different tracks (e.g., different files). To export the composite presentation, the media editing application of some embodiments performs multiple rendering passes on a sequence of clips while muting one or more of the clips in the sequence. In some such embodiments, the composite presentation is output to different tracks based on metadata associated with the clips. For example, with these metadata tags, a multi-track output can be specified as a first track for each clip tagged as dialog, a second track for each clip tagged as music, etc. In this manner, the editor or a movie studio can easily replace one track with another track.

The media editing application of some embodiments uses metadata to provide user interface controls. In some such embodiments, these controls are used to display properties of tagged clips and/or specify parameters that affect the tagged clips. Example of such user interface controls include audio meters, volume controls, different controls for modifying (e.g., distorting, blurring, changing color) images, etc.

Several more examples editing operations are described below. Section I describes several examples of applying effects to different tagged clips. Section II then introduces compound clips and proves several examples of applying effects to the compound clips. Section III then describes examples of metering clips that has previously been mixed. Section IV then describes constructing user interface controls and propagating parameters specified through the user interface controls. Section V then describes using metadata tags to output a composite presentation to different tracks. Section VI describes an example graphical user interface and software architecture of a media editing application of some embodiments. Section VI also describes several example data structures for the media editing application of some embodiments. Finally, Section VII describes an electronic system which implements some embodiments of the invention.

I. Applying Effects to Clips Based on Metadata

In some embodiments, the media editing application applies one or more effects to clips in a composite presentation based on metadata (i.e., metadata tags) associated with the clips. In creating the composite presentation, one or more effects are associated with a metadata tag. Once the effects are associated, the media editing application applies the effects to different pieces of media content tagged with the metadata tag in order to create the composite presentation.

There are many different effects or filters that can be associated with metadata to facilitate editing operations. Although this list is non-exhaustive, several example audio effects include an equalizer for modifying the signal strength of a clip within specified frequency ranges, an echo effect for creating an echo sound, and a reverb effect for creating a reverberation effect that emulates a particular acoustic environment. Several example video effects or image effects include color filters that operate on color values, different filters that sharpen, stylize, distort, or blur an image, and fade-in/fade-out effects for creating transitions between scenes.

FIG. 1 conceptually illustrates a process 100 that some embodiments use to apply effects to different clips based on metadata. Specifically, this figure illustrates process 100 that applies effects to the different clips in a composite presentation when outputting the composite presentation. In some embodiments, process 100 is performed by a media editing application. This process 100 will be described by reference to FIGS. 3-5 that illustrate application of effects on a set of clips based on the association of the effects to metadata and the association of the metadata to the set of clips.

Figure 2:
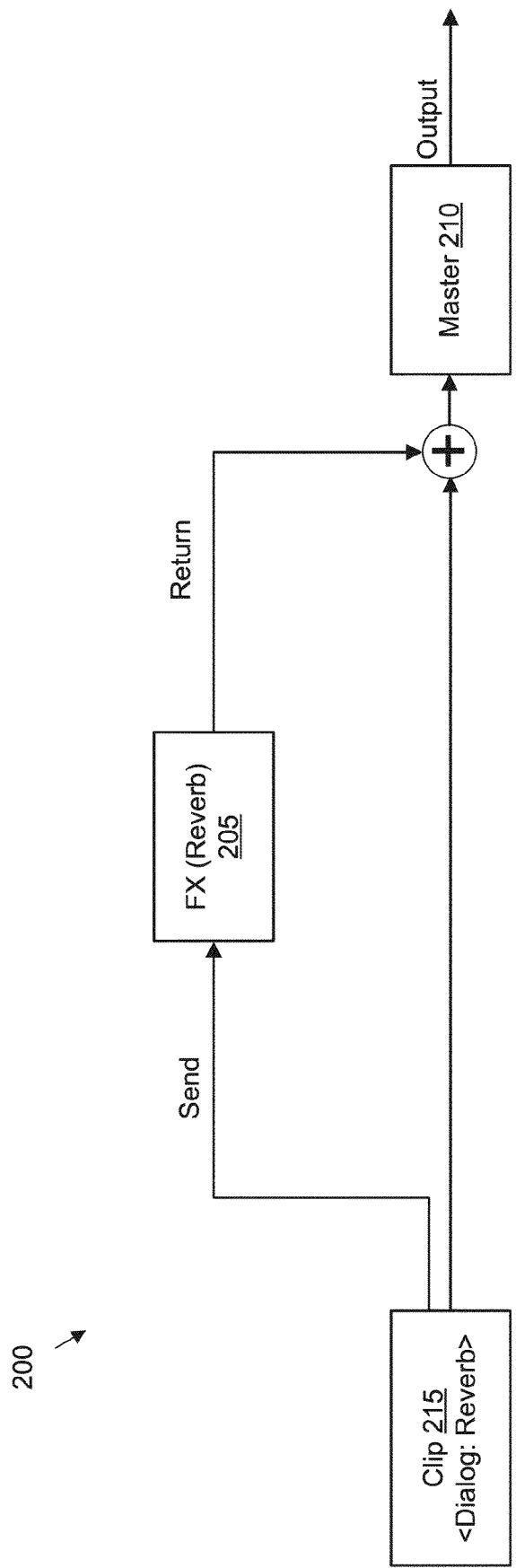
FIG. 2 shows a signal flow diagram that conceptually illustrates how some embodiments apply the reverb effect.

As shown, process 100 identifies (at 105) each clip tagged with a particular metadata tag having an associated effect. FIG. 2 shows a signal flow diagram 200 that conceptually illustrates application of an effect. Specifically, the signal flow diagram 200 illustrates an example of how the audio signal of a clip 215 is routed to output a mixed audio signal with a specified reverb effect. As shown, the figure includes the clip 215, a master 210, and a reverb effect ("FX") module 205. The reverb FX module 205 receives an audio signal of one or more clips, applies the reverb effect to the received audio signal, and outputs an audio signal containing the reverb effect. The master 210 defines the output audio level of a composite presentation.

In example illustrated in FIG. 2, process 100 identifies the clip 215 as a clip tagged with a "Dialog" tag having an associated effect. In some embodiments, the identification is initiated based on user input to output a composite presentation based on a sequence of clips that define the composite presentation. Alternatively, in some embodiments, the media editing application performs rendering and/or mixing operations in the background in order to output the composite presentation (e.g., to play a preview of the composite presentation in real-time).

Process 100 then identifies (at 110) the effect that is associated with the particular metadata tag. As shown FIG. 2, the clip 215 is associated with a "Dialog" tag. This piece of metadata is associated with a reverb effect. Process 100 then determines (at 115) whether the effect requires data of one or more clips to be routed to one effect creation unit (e.g., by using send and return).

When the effect does not requires data of one or clips to be routed, process 100 proceeds to 120 which is described below. Otherwise, process 100 process 100 defines (at 135) a bus for the particular metadata tag. In some embodiments, the process creates this bus to send a combined audio signal of each clip tagged with the particular metadata tag. In the example illustrated in FIG. 2, an aux send bus is defined to send an audio signal of each clip tagged with the "Dialog tag".

Process 100 then sends (at 140) an audio signal of each identified clip over the aux send bus. Process 100 identifies (at 145) parameters of the identified effect. Different effects can be associated with different parameters. For example, a reverb effect can have one set of parameters including the output audio level of the reverberation effect, the type of reverberation (e.g., room, hall, space), etc. Different from the reverb effect, an image distortion effect can have a different set of settings or parameters for distorting images.

The process 100 then applies (at 150) the effect to each identified clip based on the identified parameters. As shown in FIG. 2, the clip 215 is tagged with a "Dialog" tag. This "Dialog" tag is associated with a reverb effect. Based on the association, the reverb effect is applied to the clip 205 using the send and return. Specifically, the audio signal of the clip 215 is routed to the reverb FX module 205. The audio signal of is directly routed to the master 210. The reverb FX module 205 then applies the reverb effect to the received audio signal and returns an audio signal containing the reverb effect to the master 210. The "+" symbol in this and other figures indicates that audio signals are being combined (i.e., mixed, summed). Hence, the master 210 receives the mixed audio signal and outputs a resulting mixed audio signal for the composite presentation.

In the example illustrated in FIG. 2, the audio signal of the clip 215 and the audio signal containing the reverb effect are mixed because a reverb effect represents one type of effect that typically mixes back in the original audio signal. An echo effect is another example of such type of effect. For example, the output of the reverb FX module 205 for a clip with dialog is the reverberation of that dialog (e.g., in a theatre, in a hallway). Therefore, the audio signal of the clip is mixed back in such that the audience can hear the dialog and not just the reverberation of that dialog.

In the example illustrated in FIG. 2, the routing of the audio signal to the reverb effect module 205 is transparent to the application's user. The user does not have to add an auxiliary track, insert the reverb effect to the auxiliary track, specify a bus for the auxiliary track, etc. The user can simply associate the clip's metadata tag with the reverb effect. The media editing application then automatically applies the reverb effect to the clip 215 using the "send and return".

One reason for utilizing the "send" technique is that it allows a combined audio signal of multiple clips to be processed through the same effects unit. In most cases, the "send" operation is used to efficiently process multiple audio signals as one composite audio signal. In other words, as multiple audio signals are mixed and processed together, the "send" technique can be less computationally expensive than applying an effect to each individual audio signal.

Figure 3:
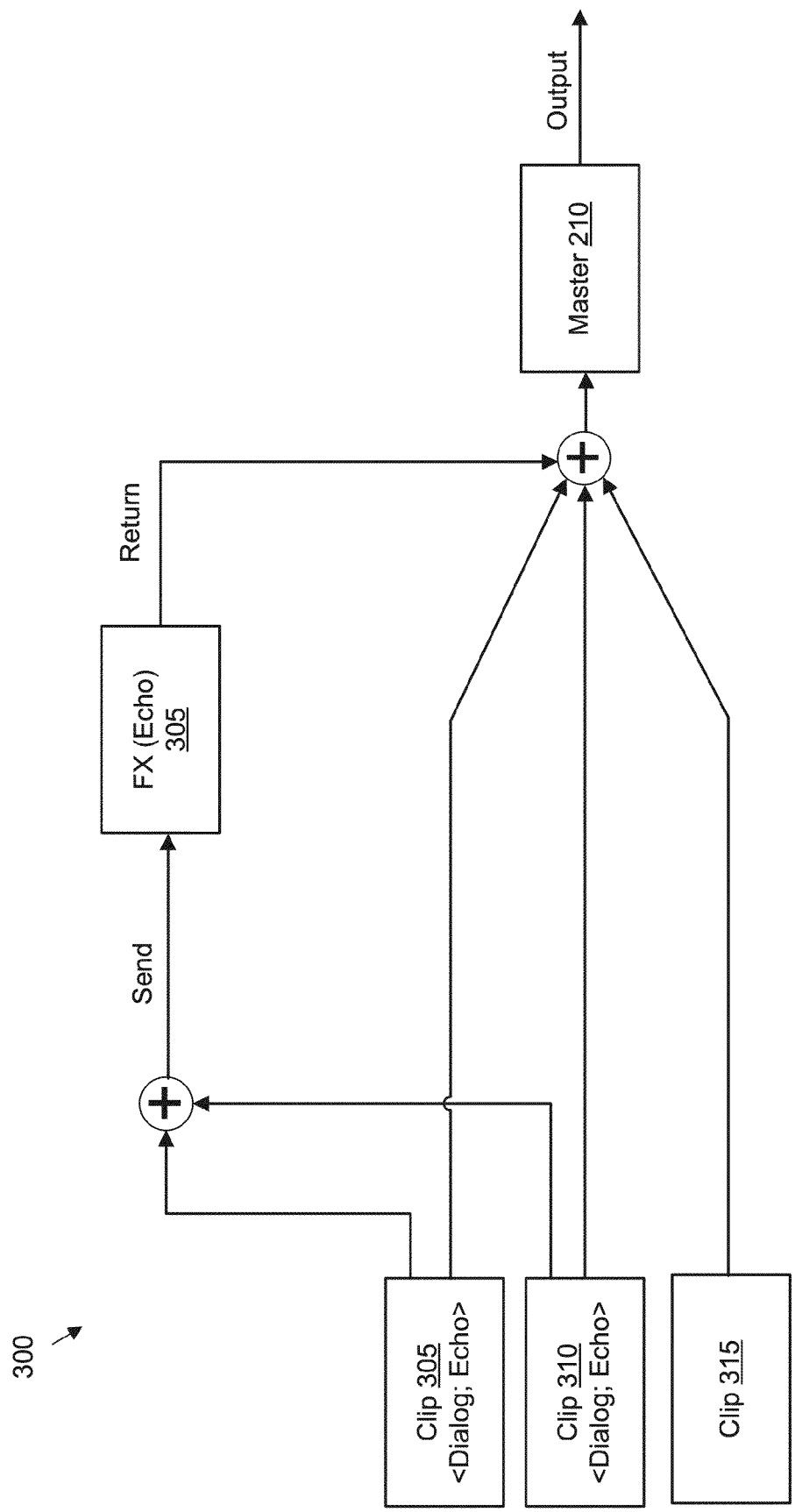
FIG. 3 shows a signal flow diagram of some embodiments that conceptually illustrates application of an effect on multiple clips.

FIG. 3 shows a signal flow diagram 300 that conceptually illustrates an example of applying an effect to multiple different clips. Specifically, this figure illustrates an example of how audio signals of clips 305-315 are routed to output a mixed audio signal for a composite presentation. As shown, the figure includes clips 305-315, an echo FX module 305, and the master 210. The master 210 is the same as the one described above by reference to FIG. 2. The echo FX module 305 receives an audio signal of one or more audio clips, applies the echo effect to the received audio signal, and output an audio signal containing the echo effect.

As shown in FIG. 3, the audio signals of clips 305-310 are sent to the echo FX module 305. The audio signals of clips 305-315 are sent to the master 210. The echo FX module 305 receives a mixed audio signal of clips 305-310, processes the received audio signal, and returns an audio signal containing the echo effect to the master 210. The master 210 receives a mixed audio signal of clips 305-315 and the audio signal containing echo effect from the echo FX module 305. The master 210 then outputs a resulting mixed audio signal for the sequence of clips 305-315. Here, the resulting mixed audio signal is a composite audio signal of clips 305-315 and includes the echo effect applied to clips 305 and 310. In some embodiments, the duration of this composite audio signal is the duration of the composite presentation.

Figure 4:
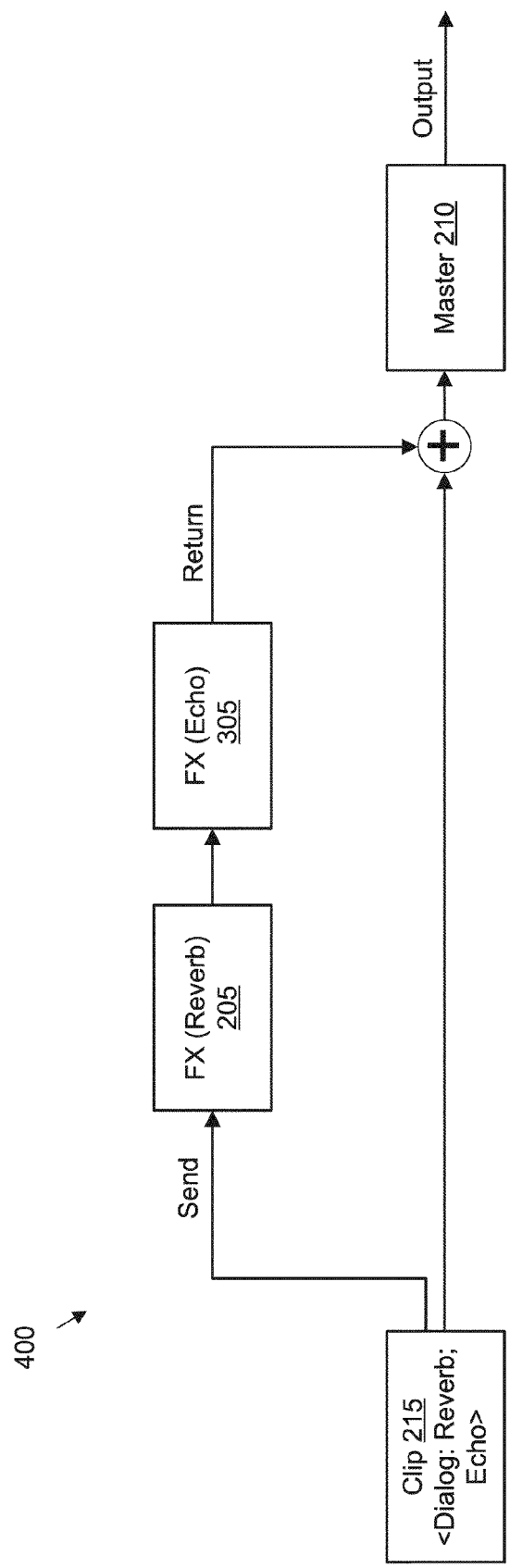
FIG. 4 shows a signal flow diagram that conceptually illustrates how some embodiments apply an effect chain with multiple different effects.

In the examples described above, one effect is applied to one or more clips. FIG. 4 shows a signal flow diagram 400 that conceptually illustrates applying an effect chain with multiple different effects. In some embodiments, the effect chain represents an ordered sequence or series of effects that is specified for a particular metadata tag and applied to one or more clips tagged with the particular metadata tag.

As show in FIG. 4, the clip 215 is tagged with the "Dialog" tag, and a chain of effect has been specified for this tag. The chain of effects includes a reverb effect and an echo effect. As the echo effect is being applied to the clip 215, the signal flow diagram 400 includes an echo FX module 305.

In the example illustrated in FIG. 4, the clip's audio signal is first routed to the reverb FX module 205. This is because the reverb effect is the first effect in the chain of effects. Here, the reverb FX module 205 applies the reverb effect to the incoming audio signal and outputs an audio signal containing the reverb effect. To continue the chain of effects, the audio signal containing the reverb effect is received at the echo FX module 305. The echo FX module 305 processes the incoming audio signal and outputs a processed audio signal. As indicated by the "+" symbol, the audio signal from the echo FX module 410 is then mixed with the audio signal of the clip 215. The master 210 receives the mixed audio signal and outputs a resulting mixed audio signal.

Referring back to FIG. 1, when the effect does not require data of one or more clips to be routed, process 100 identifies (at 120) properties of the identified effect. As mentioned, different effects can have different properties. For example, an image distortion effect can have one set of parameters for distorting an image, while an echo effect can have another set of parameters for adding the echo to an audio signal.

The process 100 then applies (at 125) the effect to each identified clip. Specifically, each particular effect is applied to the clip based on the properties of the particular effect. The media editing application of some embodiments applies one or more effects directly on each clip without using the "send". One example of such technique is applying effects as "insert" effects. Different from the "send" effect, an "insert" effect simply processes the incoming audio signal and outputs a processed audio signal. In using this technique, the audio signals of different clips are not routed over an auxiliary bus to an effect module to be processed as one combined audio signal. Also, the output of an effect module is not mixed back in with one or more original audio signals. For example, the output audio data of a filter or an effect that compresses or distorts input audio data does not need to be mixed back in with the original uncompressed or undistorted audio data. Similarly, the output of an equalizer that reduces the bass of a clip does not need be mixed back in with the original clip as it will defeat the purpose of reducing the bass in the first place. Many different audio effects or audio filters (e.g., equalizers, compressors, band-pass filters) are applied as "insert" effects, in some embodiments.

Figure 5:
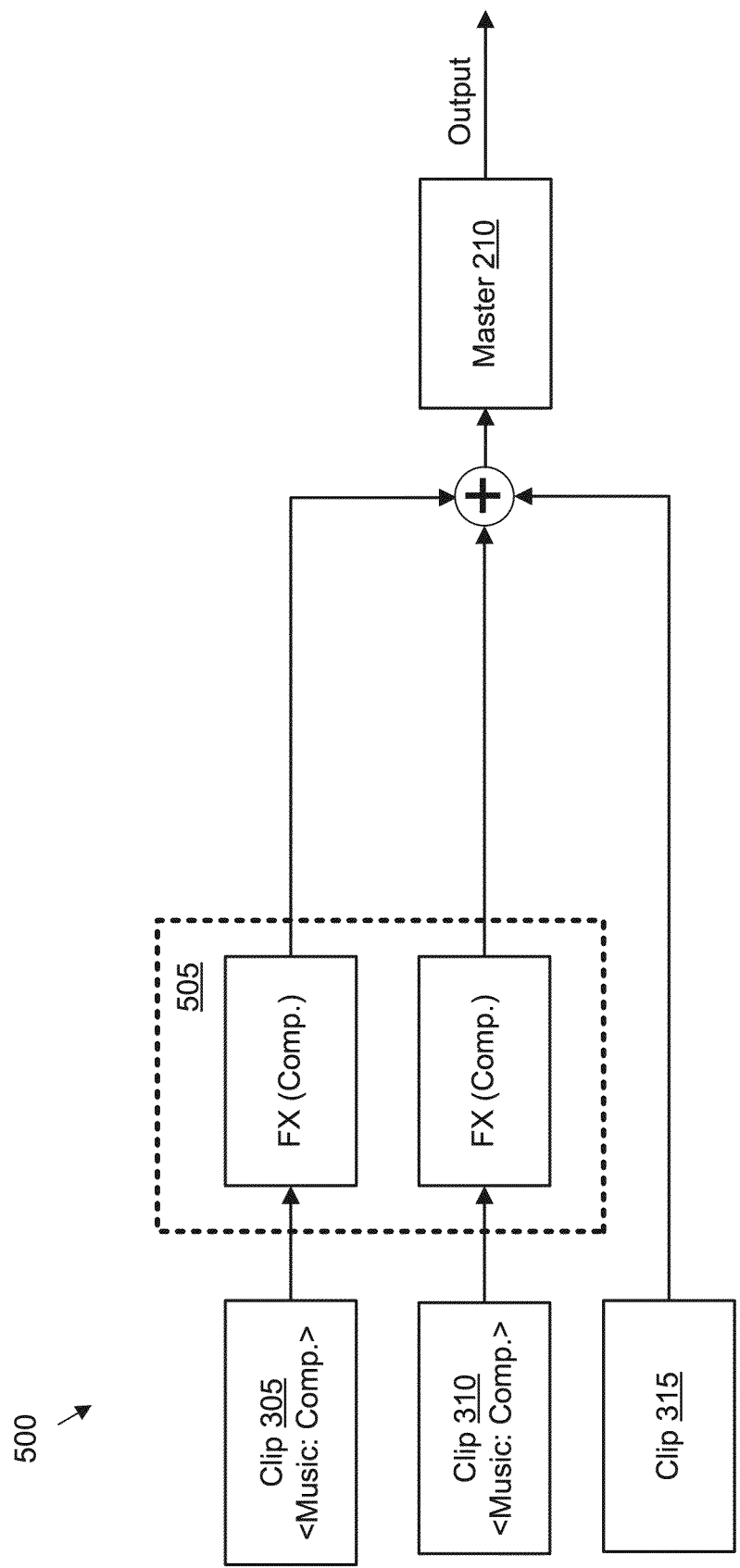
FIG. 5 shows a signal flow diagram that conceptually illustrates how some embodiments apply a particular effect or a particular filter as an insert effect.

FIG. 5 shows a signal flow diagram 500 that conceptually illustrates compressing audio signals of clips 305-310 based on the clips' association with a "Music" tag. Specifically, this figure illustrates how the media editing application of some embodiments compresses the audio signals of clips 305-310 as insert effects instead of routing the audio signals using the "send and return". As shown, the figure includes a set of compression modules 505. In some embodiments, the set of compression modules 505 represents separate instances of the same compression module that are linked parametrically. For example, the output of these instances can be based on the same set of compression parameters or settings.

As shown in FIG. 5, the audio signals of clips 305-310 are individually compressed by the set of compression modules 505. The compressed audio signals of clips 305-310 are then output to the master 210. As indicated by the "+" symbol, the compressed audio signals of the clips 305 and 310, and the audio signal of clip 315 are then mixed. This mixed audio signal is received at the master 210 that defines the output audio signal for the composite presentation.

Referring back to FIG. 1, process 100 determines (at 130) whether any other clip is tagged with a different tag having an associated effect. When no other clip is tagged with a different tag, process 1500 proceeds to 1520. Otherwise, the process outputs (at 155) the composite presentation. For example, the media editing application may output the composite presentation by playing a real-time preview. Alternatively, the media editing application renders and/or mixes the composite presentation to storage (e.g., for playback at another time). The process then ends.

Some embodiments perform variations on process 100. For instance, process 100 of some embodiments identifies each effect in an effect chain. Specifically, before identifying a next tag with an effect, process 100 applies each effect in the chain to a set of tagged clips. Also, some embodiments might take into account that a clip can be a compound clip (described below). In some such embodiments, process 100 identifies each outer metadata tag of the compound clip and each inner tag of the compound clip's nested clips. Process 100 then applies one or more effects to the compound clip and/or the inner clips according to this identification. Several examples applying effects to compound clips are described below by reference to FIGS. 6-10.

In the examples described above, different effects are applied using different techniques. In some embodiments, the media editing application automatically determines whether to apply an effect by using an "insert" or by using the "send and return". For instance, the media editing application of some embodiments automatically applies a first type of effect (e.g., reverb, echo) using the "send and return", while applying a second type of effect (e.g., compressor, equalizer) as an "insert" effect. In conjunction with this automatic determination, or instead of it, the media editing application of some embodiments provides one or more user-selectable items for specifying whether to apply an effect as a "send" effect or an "insert" effect.

II. Applying Effects to Compound Clips

The media editing application of some embodiments allow users to create compound clips from multiple different clips. In some embodiments, a compound clip is any combination of clips (e.g., in a composite display area or in a clip browser as described below by reference to FIG. 22) and nests clips within other clips. Compound clips, in some embodiments, contain video and audio clips as well as other compound clips. As such, each compound clip can be considered a mini project or a mini composite presentation, with its own distinct project settings. In some embodiments, compound clips function just like any other clips. That is, the application's user can add the compound clips to a project or composite display area, trim them, tag them, retime them, and add effects and transitions.

Figure 6:
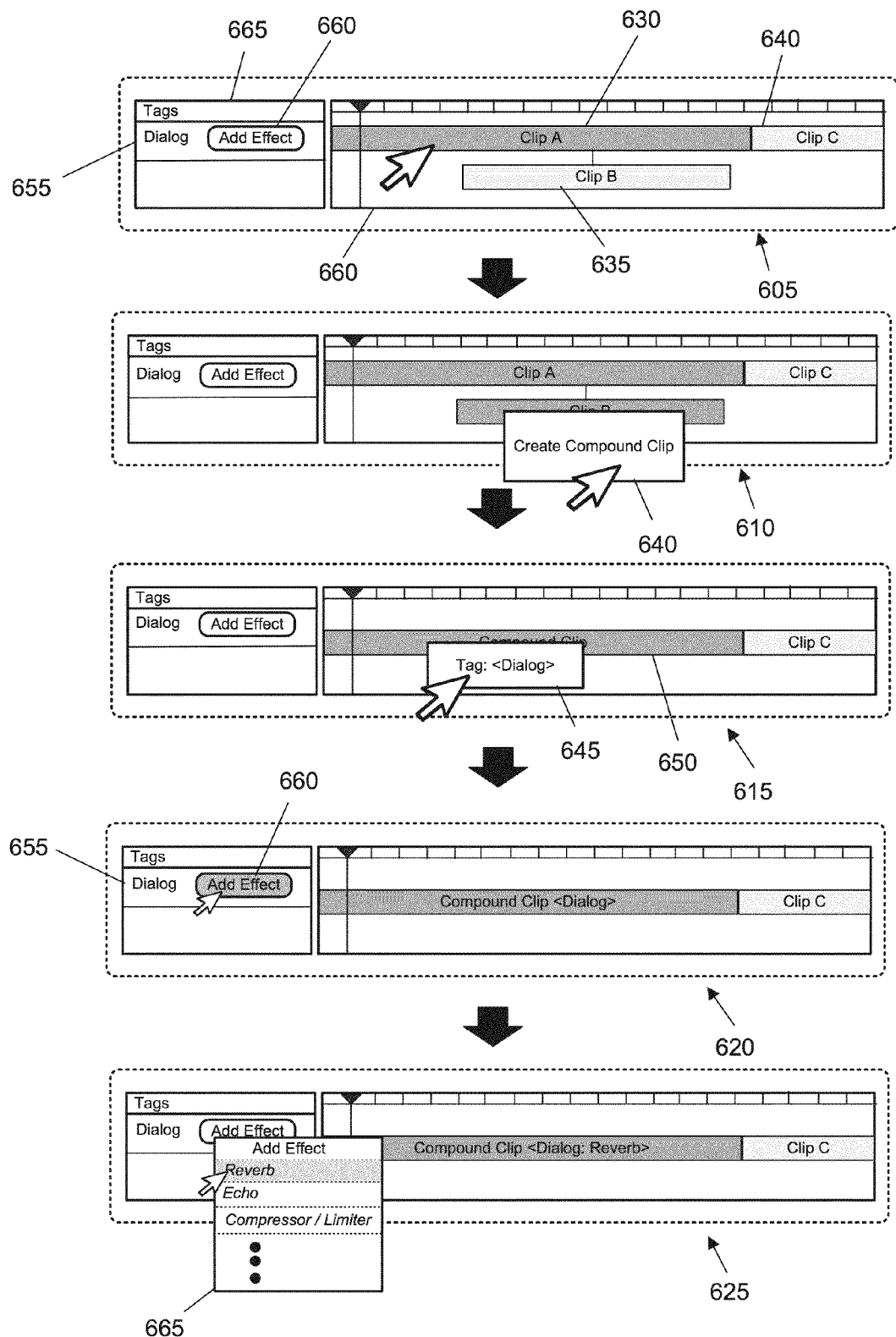
FIG. 6 illustrates an example of specifying an effect for a compound clip.

FIG. 6 illustrates an example of specifying an effect for a compound clip. Specifically, this figure illustrates (1) creating a compound clip from multiple different clips, (2) tagging the compound clip with a metadata tag, and (3) specifying an effect for the metadata tag. Five operational stages 605-625 of the GUI are shown in this figure.

As shown, the figure includes a composite display area 660 and a tag display area 665. The composite display area 660 provides a visual representation of the composite presentation (or project) being created with the media editing application. Specifically, it displays one or more geometric shapes that represent one or more media clips that are part of the composite presentation. In some embodiments, the tag display area 665 displays one or more pieces of metadata associated with different media clips.

The first stage 605 shows the tag display area 665 and the composite display area 660. The tag display area 665 includes a metadata tag 655 that is associated with an add effect control 660. The composite display area 660 displays representations of three clips 630-640 that are not tagged with the metadata tag 655. In this first stage, the user selects the clip 630 by selecting a corresponding representation in the composite display area 660.

The second stage 610 shows the creation of a compound clip from clips 630 and 635. Specifically, after selecting these two clips, the user selects a selectable option 640 (e.g., context menu item) to create the compound clip 650 as illustrated in the third stage 615. In some embodiments, the media editing application provides several different controls (not shown) for creating the compound clip. Several examples of such controls include (1) a text field for inputting a name for the compound clip, (2) a first set of control for specifying video properties (e.g., automatically based on the properties of the first video clip, custom), and a second set of controls for specifying audio properties (e.g., default settings, custom).

The third stage 615 illustrates tagging the compound clip 650 with the first metadata tag 655. Here, a tagging option 645 is used to tag the compound clip 650. However, different embodiments provide different ways for tagging a compound clip. The fourth stage 620 illustrates the selection of an add effect control 660. The selection causes an add effect window 665 with a list of effects to appear as illustrated in the fifth stage 625. As shown in the fifth stage 625, the add effect window 665 displays several different effects from which the user can choose from to associate with the first metadata tag 655. The user then selects the reverb effect to associate it with the first metadata tag 655.

Once the effect is set, the media editing application applies the reverb effect to the compound clip 650 in order to produce a resulting composite presentation. For example, the media editing application of some embodiments applies the reverb effects to the compound clip 650 to play a real-time preview of the presentation. Alternatively, the media editing application renders or outputs the sequence in the composite display area 660 to storage for playback at another time.

Figure 7:
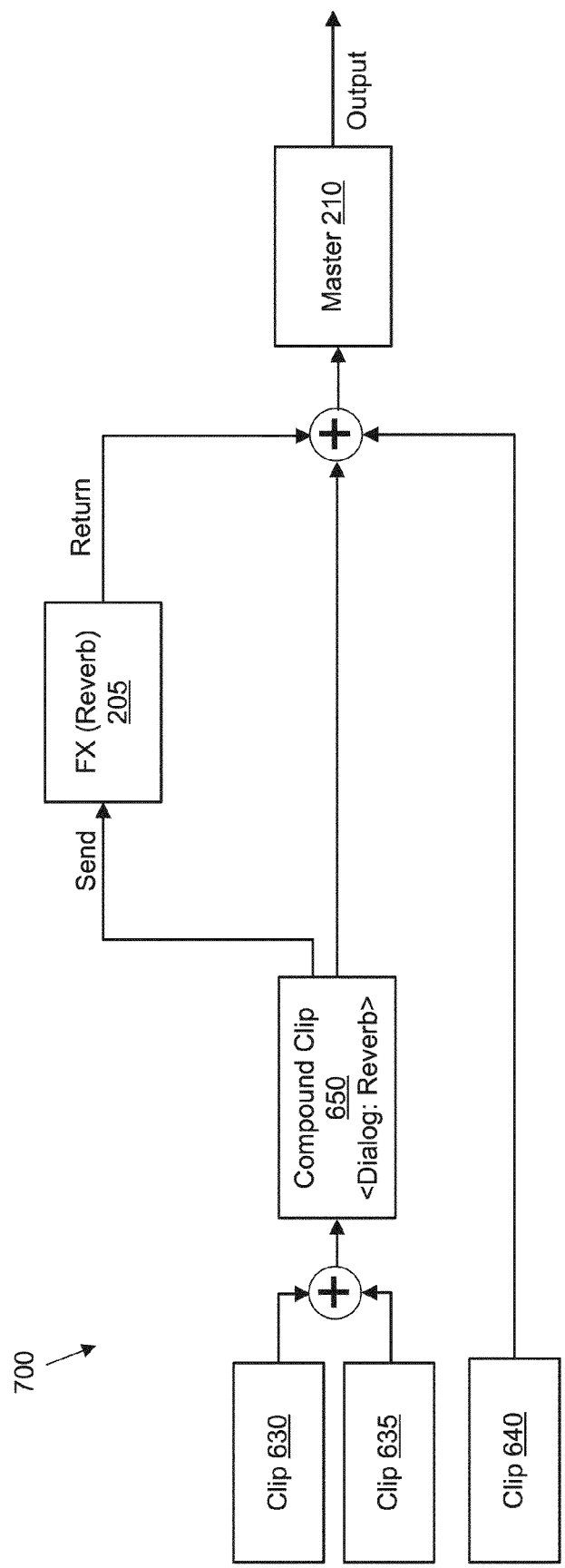
FIG. 7 shows a signal flow diagram of some embodiments that conceptually illustrates the application of the reverb effect on the compound clip.

FIG. 7 shows a signal flow diagram 700 that conceptually illustrates the application of the reverb effect on the compound clip 650, in some embodiments. Specifically, this figure illustrates an example of how audio signals of clips 630-640 (in the composite display area 660 of FIG. 6) are routed to output a mixed audio signal with the reverb effect. As shown, the figure includes the clips 630-640, the master 210, and the reverb FX module 205.

As shown in FIG. 7, the audio signals of clips 630 and 635 are mixed for the compound clip 650. The mixed audio signal of the compound clip 650 is sent to the reverb FX module 205. The reverb FX module 205 processes the received audio signal and returns the audio signal containing the reverb effect to the master 210. The master 210 receives a mixed audio signal containing the audio signal of the compound clip 650, the audio signal of clip 640, and the audio signal containing reverb effect. The master 210 then outputs a resulting mixed audio signal.

In the example illustrated in FIG. 7, the "send" is performed on the audio signal of the compound clip 650. Alternatively, the media editing application of some embodiments allows its users to add "insert" effects for compound clips tagged with a metadata tag. Several examples of such "insert" effects are described above by reference to FIG. 5.

In the previous example, a compound clip is tagged with a metadata tag that is associated with an effect. Also, the nested clips of the compound clip are not tagged with this metadata tag. Accordingly, the effect associated with the compound clip's tag is applied to the audio signal of the compound clip. In some cases, one or more inner clips of the compound clip are tagged with a metadata tag. In order to simply the discussion below, a compound clip's tag will be referred to as an outer tag, while the tag of the inner clip of the compound clip will be referred to as an inner tag. Also, in several examples below, the outermost tag refers to the tag of the compound clip that is not contained by another compound clip.

Figure 8:
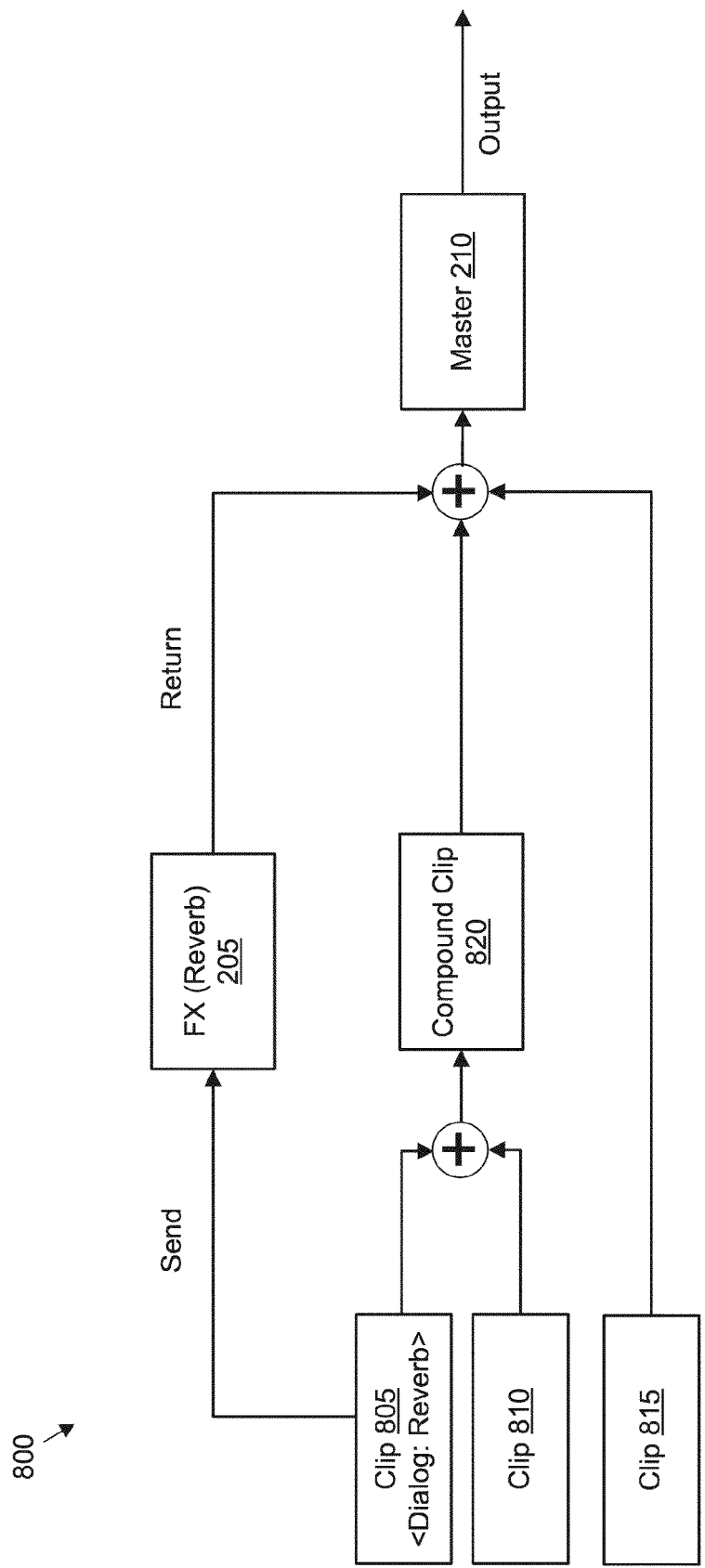
FIG. 8 shows a signal flow diagram of some embodiments that conceptually illustrates the application of the reverb effect on an inner clip of a compound clip.

FIG. 8 shows a signal flow diagram 800 that conceptually illustrates the application of the reverb effect on an inner clip 805 of a compound clip 820. Specifically, this figure illustrates an example of how audio signals of clips 805, 815, and 810 (e.g., in the composite display area 660 of FIG. 6) are routed to output a mixed audio signal with the reverb effect. In this example, the inner clip 805 has been tagged with a "Dialog" tag with a reverb effect, while the compound clip 820 is not tagged with any tag.

As shown, the audio signal of clip 805 is routed to the reverb FX module 205. This is because the clip 805 is tagged with the "Dialog" tag that is associated with a reverb effect. In other words, even though the clip 805 is a nested clip of the compound clip 820, the media editing application of some embodiments identifies each inner tag of the compound clip's nested clips to apply one or more effects. Here, the reverb FX module 205 applies the reverb effect to the received audio signal and returns an audio signal containing the reverb effect to the master 210. As indicated by the "+" symbol, the audio signals of clip 805 and 810 are combined for the compound clip 820. The audio signal of the compound clip 820, the audio signal containing the reverb effect for clip 805, and the audio signal of clip 805 are then mixed. The master 210 receives the mixed audio signal and outputs a resulting mixed audio signal.

In the example described above, the output of the reverb FX module 205 is sent to the master 210 instead of being mixed in as part of the compound clip 820. This is because the media editing application of some embodiments defines a separate auxiliary ("aux") bus or virtual pathway for one or more effects associated with a metadata tag. In some embodiments, this aux bus always outputs to the master.

Figure 9:
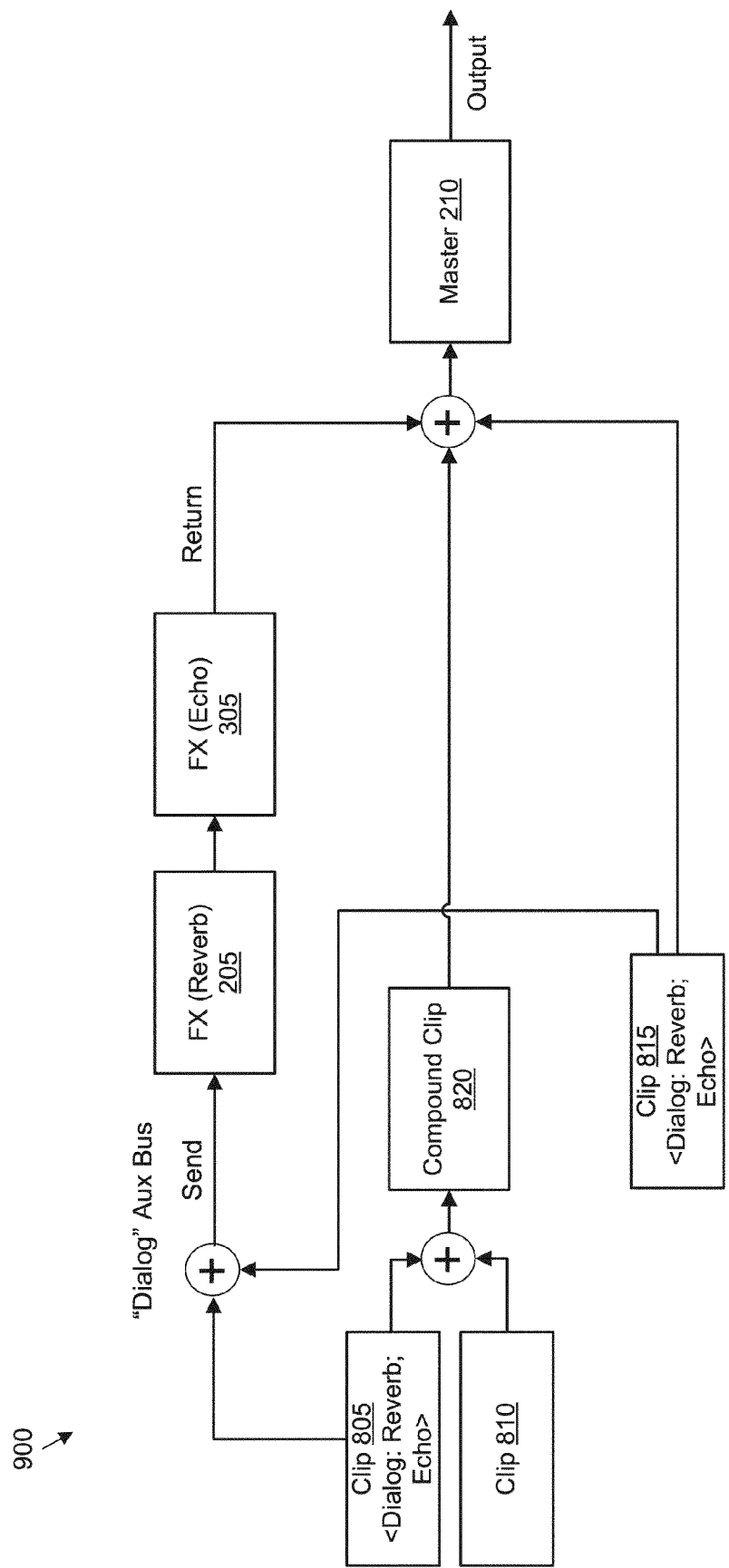
FIG. 9 shows a signal flow diagram that conceptually illustrates how some embodiments route a combined audio signal of several clips over a particular aux bus based on the clips' association with a metadata tag.

FIG. 9 shows a signal flow diagram 900 that conceptually illustrates how audio signals of several clips are routed to a particular aux bus based on the clips' association with a metadata tag. This example is similar to FIG. 8. However, the "Dialog" tag is associated with a chain of effects that includes a reverb effect and an echo effect. Also, the clips 805 and 815 are both tagged with the "Dialog" tag.

As shown in FIG. 9, the audio signal of each clip that is tagged with the "Dialog" tag is routed to the "Dialog" aux bus. Specifically, the audio signals of clips 805 and 815 are both routed to this aux bus. The audio signals are routed to the aux bus regardless of whether the clip is a nested clip (as in clip 805) or a non-nested clip (as in clip 815). The audio signals of clips 805 and 815 are then combined and sent over the aux bus in order to apply the chain of effects to the clips 805 and 805.

In the example illustrated in FIG. 9, the combined audio signal is first routed to the reverb FX module 205. To continue the chain of effects, the audio signal containing the reverb effect is received at the echo FX module 305. The echo FX module 305 processes the incoming audio signal and outputs a processed audio signal. The output of the echo FX module 305 is returned to the master 210. As indicated by the "+" symbol, the audio signals of clip 805 and 810 are combined for the compound clip 820. The audio signal of the compound clip 820, the audio signal from the echo FX module 305, and the audio signal of clip 805 are then mixed. The master 210 receives the mixed audio signal and outputs a resulting mixed audio signal.

In some cases, a compound clip is tagged with the same tag as one or more of the compound clip's inner clips. In some embodiments, the media editing application identifies an appropriate level of a compound clip to apply the effect such that the effect is not reapplied at another level. For example, when the inner clip's tag is the same as the compound clip's outer tag, the media editing application of some embodiments identifies the compound clip's outer tag and performs the editing operations based on the compound clip's outer tag. This prevents the same effect being applied to the compound and one or more of the compound clip's nested clips.

Figure 10:
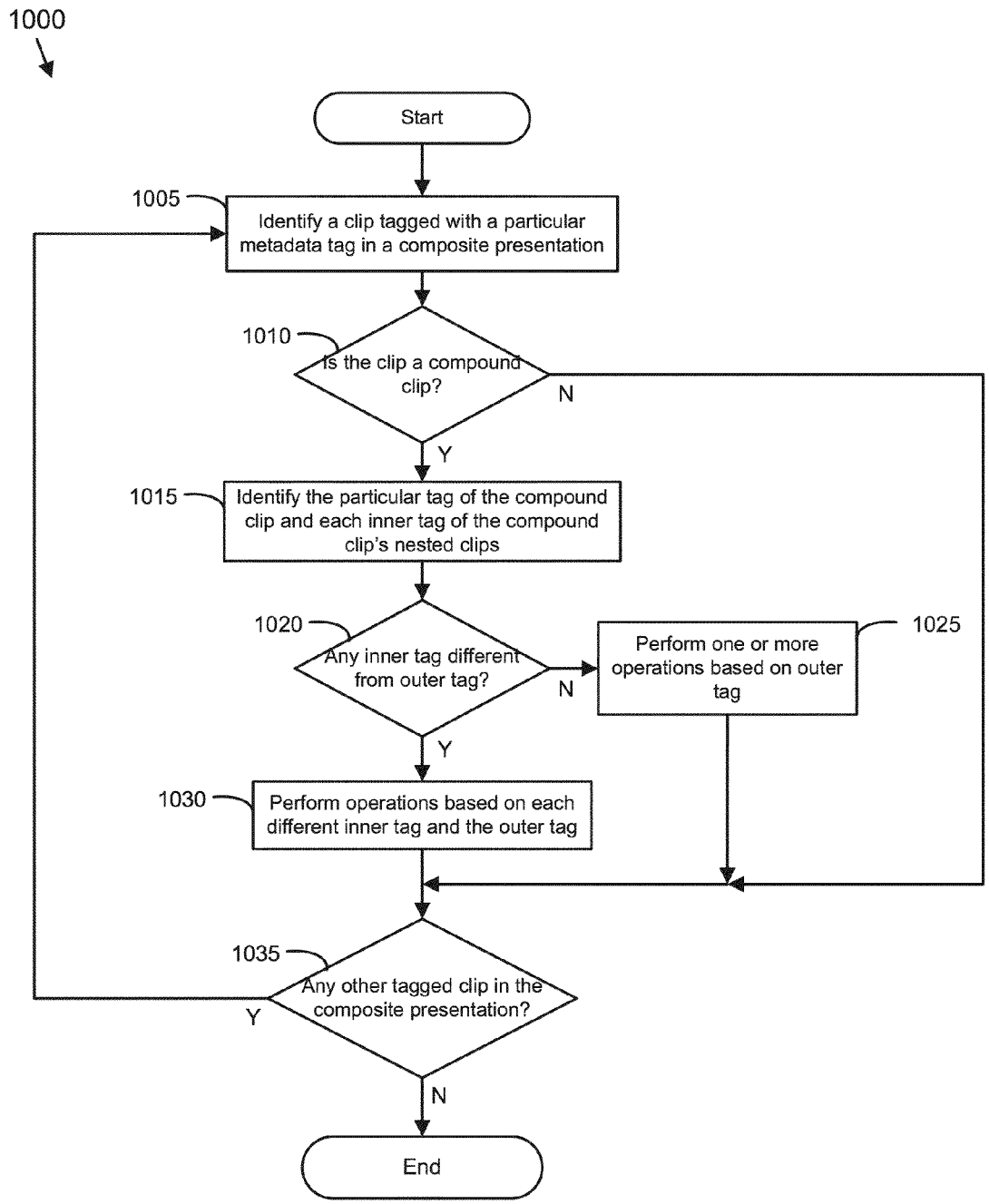
FIG. 10 conceptually illustrates a process that some embodiments use to apply one or more effects to a compound clip and/or the compound clip's nested clips.
Figure 11:
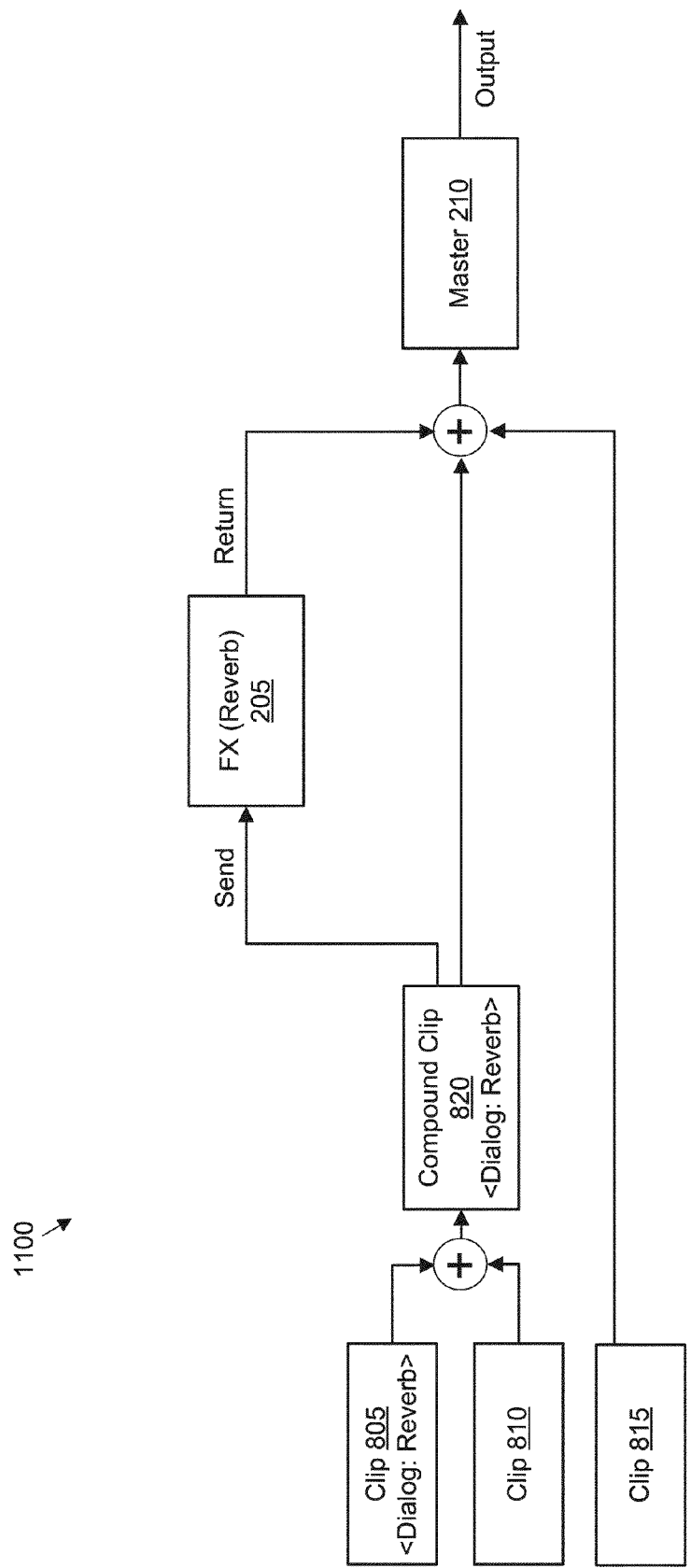
FIG. 11 illustrates an example of how some embodiments perform editing operations based a compound clip's tag.

FIG. 10 conceptually illustrates a process 1000 that some embodiments use to apply one or more effects to a compound clip and/or the compound clip's nested clips. In some embodiments, process 1000 is performed by a media editing application. Process 1000 may be a performed in conjunction with several other processes (e.g., including FIGS. 15, 16, and 20 described below). Process 1000 will be described by reference to FIG. 11 that illustrates applying an effect to a compound clip based on the compound clip's outer tag.

As shown, process 1000 identifies (at 1005) a clip tagged with a particular metadata tag in a composite presentation. Process 1000 then determines (at 1010) whether the clip tagged the particular metadata tag is a compound clip. In the example illustrated in FIG. 11, the clip 820 is a compound clip tagged with a particular metadata tag. Specifically, the compound clip 820 is associated with a "Dialog" tag having a reverb effect.

When the clip is not a compound clip, process 1000 proceeds to 1035, which is described below. Otherwise, process 1000 identifies (at 1015) the particular metadata tag of the compound clip and each inner tag of the compound clip's nested clips. Process 1000 then determines (at 1020) whether any inner tag of the compound clip's nested clips is different from the outer tag of the compound clip.

When no inner tag is different than the outer tag or no nested clip is tagged with a tag associated with an effect, process 1000 performs (at 1025) one or more operations based on the outer tag. In the example illustrated in FIG. 11, as the compound clip's outer tag takes precedence over the inner tag, the effect associated with the inner tag of inner clip 805 is not applied to this inner clip. Instead, the effect is applied to the mixed audio signal of the compound clip 820. Specifically, the audio signals of clips 810 and 805 are mixed as a mixed audio signal for the compound clip 820. As the compound clip is tagged with the "Dialog" tag, the mixed audio signal of the compound clip is then sent to the reverb FX module 205. Although the clip 805 is also tagged with the "Dialog" tag, the clip's audio signal is not sent to the reverb FX module. This is because the media editing application identified that the compound clip's outer tag is the same as the inner tag of the nested clip 805.

The reverb FX module 205 applies the reverb effect to the received audio signal and returns an audio signal containing the reverb effect to the master 210. The mixed audio signal of the compound clip 820, the audio signal containing the reverb effect from the reverb FX module 205, and the audio signal of clip 815 are then mixed. The master 210 then receives the mixed audio signal and outputs a resulting audio signal.

Referring back to FIG. 10, when one or more inner tags of the compound clip's nested clips are different, process 1000 performs (at 1030) one or more operations based on each different inner tag. Process 1000 also performs (at 1030) one or more operations based on the compound clip's outer tag. In some embodiments, process 1000 applies the different effects following a sequence of operations (e.g., as represented in a signal chain or render graph). For example, when a reverb effect is associated with a first metadata tag of a compound clip's nested clip, process 1000 of some embodiments first applies the reverb effect to the compound clip's nested clip. Once the effect is applied to the nested clip, process 1000 combines the nested clip with one or more other clips in order to apply a second effect associated with a second metadata tag of the compound clip.

Process 1000 then determines (at 1035) whether there is any other tagged clip in the composite presentation. When there is another tagged clip, process 1000 returns to 1005 which was described above. Otherwise, process 1000 ends.

Some embodiments perform variations on process 1000. For example, the specific operations of process 1000 may not be performed in the exact order shown and described. The specific operations may not be performed in one continuous series of operations, and different specific operations may be performed in different embodiments.

III. Audio Meters

In many of the example described above, the audio signals of several clips are mixed and output as one combined audio signal for a composite presentation. In some cases, the mixed audio signal of a compound clip is again combined with an audio signal of another clip to output a composite presentation. In some embodiments, the media editing application displays the audio level of a set of one or more clips even though the set of clips has been mixed with other clips.

A. Displaying Audio Levels

Figure 12:
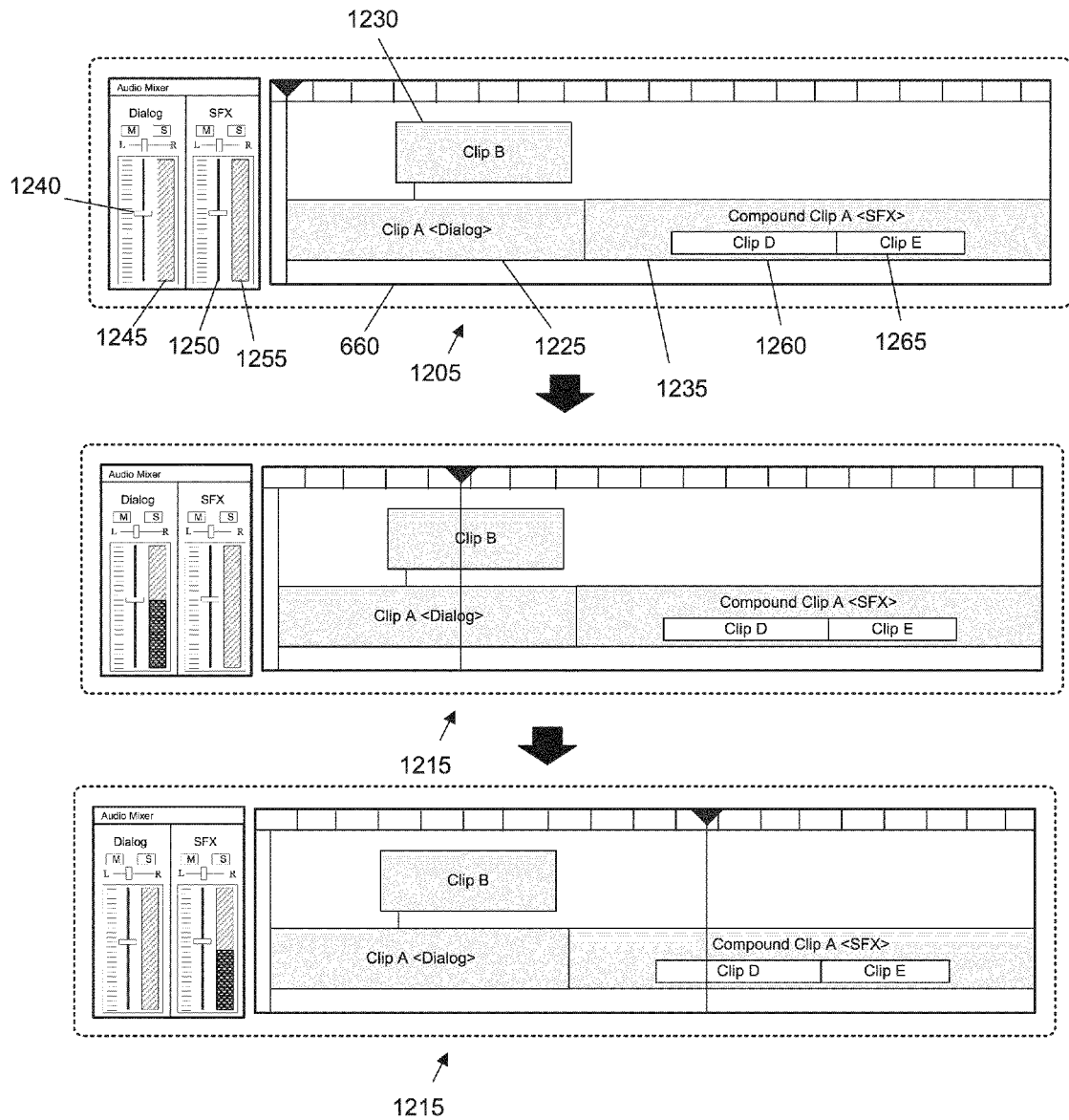
FIG. 12 illustrates example meters that indicate audio levels of several clips that have been mixed with other clips.

FIG. 12 illustrates an example of displaying the audio levels of several mixed clips. Specifically, this figure illustrates meters that indicate the audio levels of the clips even though the clips have been mixed with other clips. Three operational stages 1205-1215 are shown in this figure. The composite display area 660 is the same as the one described above by reference to FIG. 6. The figure also includes an audio mixer 1220.

In some embodiments, the media editing application provides audio meters and/or audio controls for metadata tags associated with different clips. An example of this is illustrated in FIG. 12. Specifically, the audio mixer 1220 includes a corresponding audio meter (1245 or 1255) and a level control (1240 or 1250) for each of a first metadata tag specified as "Dialog" and a second metadata tag specified as "SFX". Several other examples of providing different controls (e.g., audio meters, audio controls) for different metadata tags are described below by reference to FIG. 16.

The first stage 1205 shows the composite display area 660 and the audio mixer 1220 prior to playing the composite presentation. As shown, clip 1225 is tagged with the "Dialog" tag. Compound clip 1235 includes several nested clips 1260 and 1265. The compound clip 1235 is tagged with the "SFX" tag. The nested clips 1260 and 1265, and clip 1230 are not tagged with the "Dialog" tag or the "SFX" tag.

The second stage 1210 shows the playback of the composite presentation represented in the composite display area 660 at a first instance in time. To output the composite presentation's mixed audio signal, the audio signals of the nested clips 1260 and 1265 has been mixed for the compound clip 1235. In addition, the audio signals of the clips 1225 and 1230 have been mixed with the audio signal of the compound clip 1235. In this second stage 1210, the audio meter 1245 displays the audio level of the clip 1225 even though the clips in the composite display area 660 has been mixed to play the composite presentation.

The third stage 1215 shows the playback of the composite presentation at a second instance in time. Similar to the previous stage, the audio meter 1255 displays the audio level of the compound clip 1225 even though the compound clip has been mixed with the clips 1225 and 1230.

B. Sending an Audio Signal Over a Meter Bus

In the example illustrated in FIG. 12, the media editing application provides meters that indicate the audio levels of clips that have been mixed with other clips. To display audio levels of these clips, the media editing application of some embodiments creates one or more meter buses and routes audio signals of the clips over the meter buses.

Figure 13:
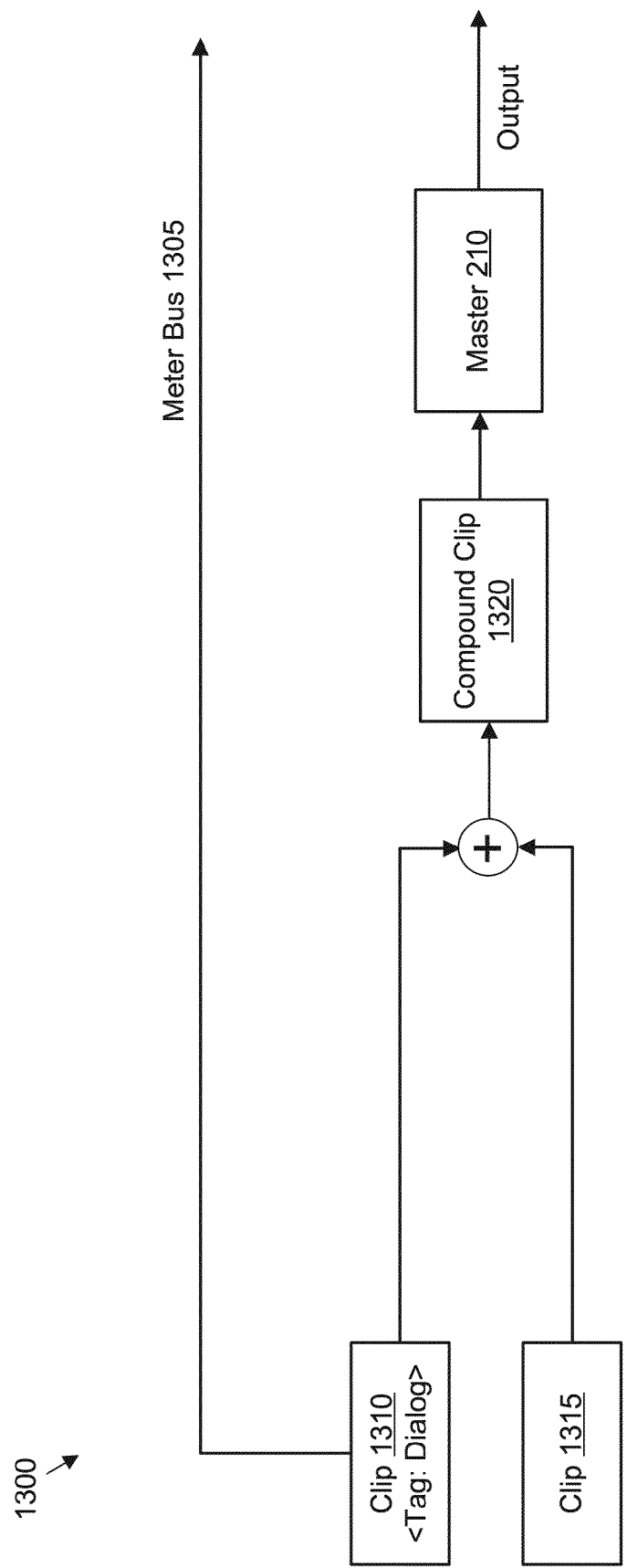
FIG. 13 shows a signal flow diagram that conceptually illustrates sending an audio signal of a clip over a meter bus in order to display the clip's audio level during playback of a mixed audio signal of a composite presentation.

FIG. 13 shows a signal flow diagram 1300 that conceptually illustrates sending an audio signal of a clip over a meter bus 1305 in order to display the clip's audio level during playback of a mixed audio signal of a composite presentation. As shown, the figure includes clips 1310 and 1315 that are mixed as a compound clip 1320. The figure also includes the meter bus 1305 and the master 210. The master 210 is the same as the one described above by reference to FIG. 2.

As shown FIG. 13, the signal flow 1300 includes a chain or a sequence of operations that is performed on the clips 1310 and 1315. However, this signal chain does not include a place to determine the audio level of clip 1310 once it has been summed with clip 1315. Specifically, in the signal chain, the clips 1310 and 1315 are mixed as the compound clip 1320. The mixed audio signal of clips 1310 and 1315 is then output through the master 210. Also, the mixed audio signal cannot be used to determine how much the clip 1310 contributed to the overall mix.

As the audio level of clip 1310 cannot be determined using the mixed audio signal, the clip's audio signal is sent over the meter bus 1305. This meter bus 1305 is not for playing sound but for metering. Specifically, in the example illustrate in FIG. 13, the meter bus 1305 is for displaying the audio level of each clip tagged with the "Dialog" tag. In some embodiments, the clips audio is routed over the meter bus 1305 to a component (not shown) that translates the audio signal to one or more meters. For example, the media editing application of some embodiments determines a set of decibel (dB) values. The set of dB values is then used to meter the audio level of the clip 1310.

Figure 14:
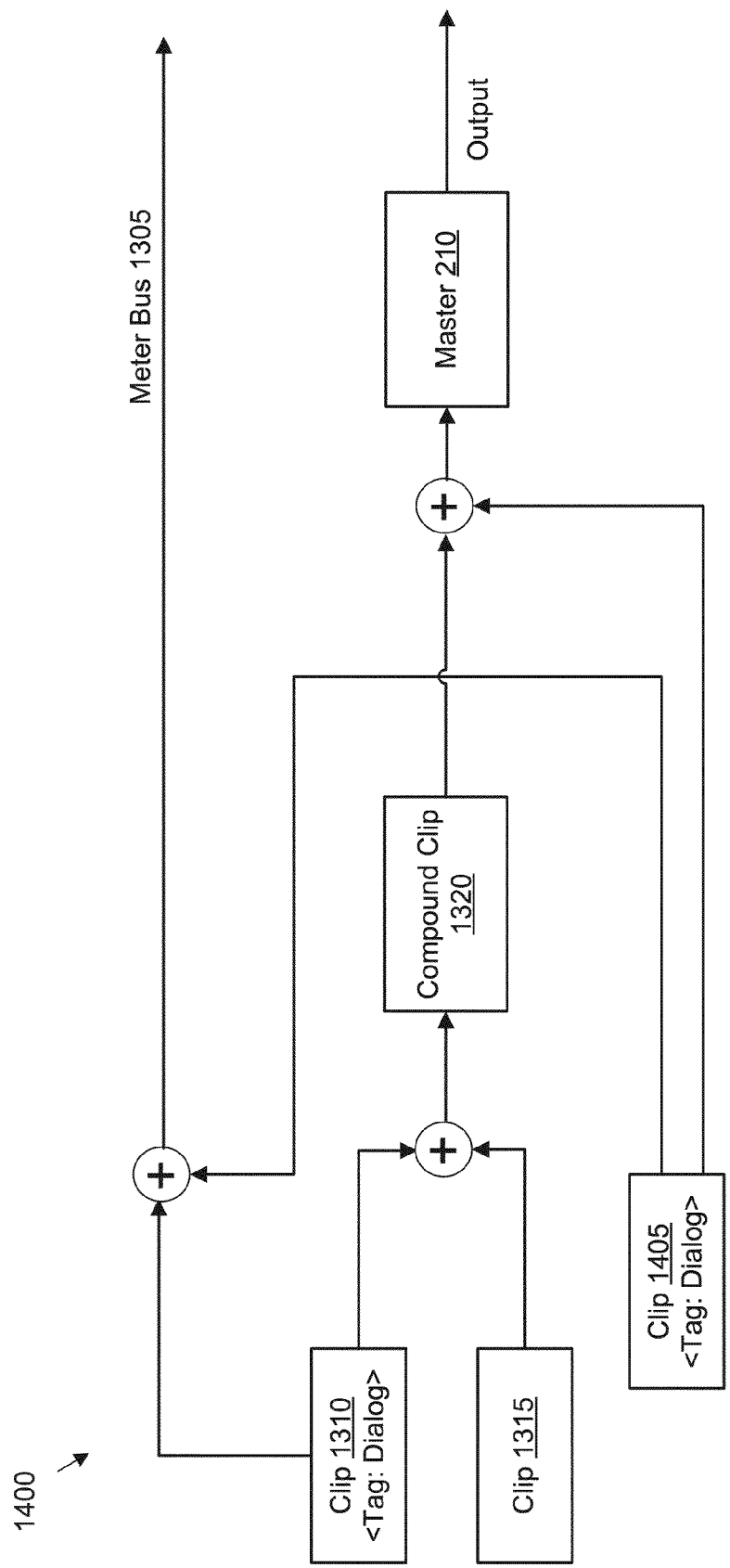
FIG. 14 shows a signal flow diagram that conceptually illustrates routing a combined audio signal of several clips over a meter bus for the purposes of displaying the clips' audio level.

FIG. 14 shows a signal flow diagram 1400 that conceptually illustrates routing a combined audio signal of several clips over the meter bus 1305 for the purposes of displaying the clips' audio level. This example is similar to FIG. 13. However, in addition to the clip 1310, the figure includes a clip 1405 that is tagged with the "Dialog" tag.

As shown in FIG. 13, the clips 1310 and 1315 are mixed as the compound clip 1320. The mixed audio signal of the clips 1310 and 1315 is then combined with the audio signal of the clip 1405. The composite audio signal of the clips 1310, Q15, and Q15 is then output through the master 210. To display the audio level of the "Dialog" clips 1310 and 1410, the audio signals of these clips are combined and sent over the meter bus 1305. Similar to the example of FIG. 14, the combined audio signal is then translated into a set of decibel values by the media editing application.

In some embodiments, the media editing application takes into account other factors when displaying the audio level of clips that has been with other clips. The media editing application of some embodiments scales (i.e., reduces or increases) the audio level of one or more clips by processing later down the signal chain. For example, in the example illustrated in FIG. 14, the audio meter for the "Dialog" clips 1310 and 1405 should reflect the audio level of the entire mix (e.g., as defined by the master 210). That is, when the master's volume is set at a particular dB, the combined audio signal of clips 1310 and 1405 should be scaled or synchronized such that audio meter does not indicate an audio level that is higher than the particular dB.

C. Estimating the Volume

In the previous example, a combined audio signal of several clips is sent over a meter bus to display the audio level of several clips. Alternatively, the media editing application of some embodiments estimates the audio level of the one or more clips. That is, instead of routing the audio signal over the meter bus, the media editing application numerically estimates the audio level by extracting metering information from the clips prior to mixing the clips.

Figure 15:
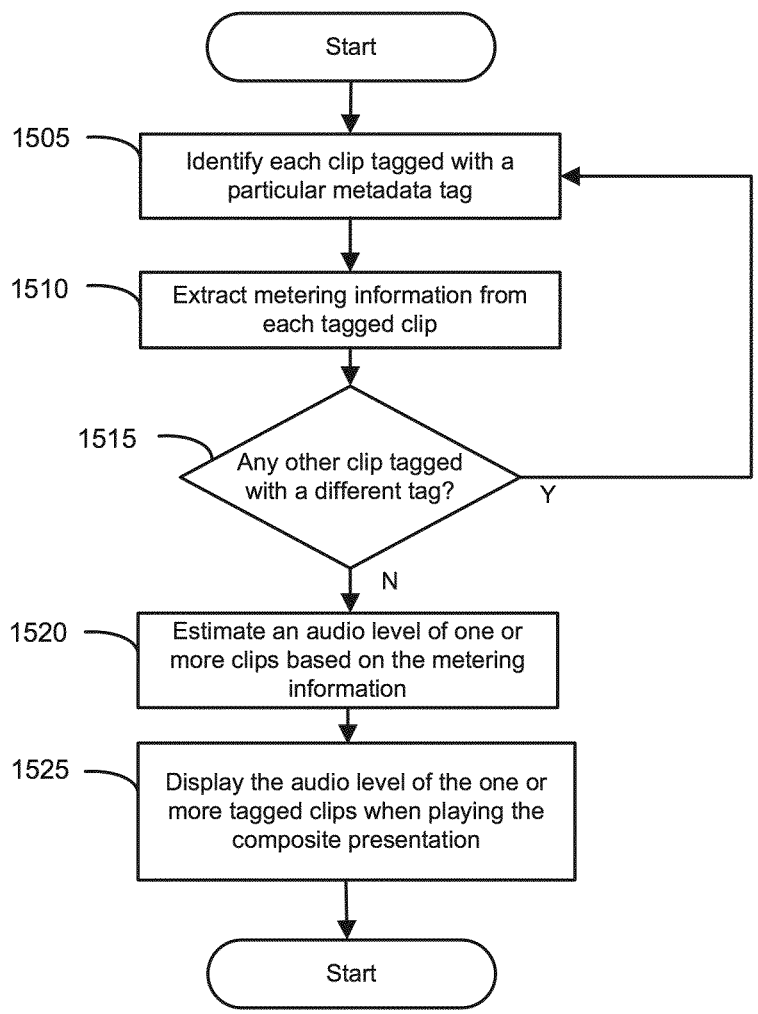
FIG. 15 conceptually illustrates a process that some embodiments use to estimate audio levels of clips that are tagged with metadata tags.

FIG. 15 conceptually illustrates a process 1500 that some embodiments use to estimate audio levels of clips that are tagged with metadata tags. In some embodiments, process 1500 is performed by a media editing application. As shown, process 1500 identifies (at 1505) each clip, in a composite presentation, that is tagged with a particular metadata tag. Process 1500 then extracts (at 1510) metering information (e.g., audio level) from each clip tagged with the particular metadata tag.

Process 1500 then determines (at 1515) whether any other clip is tagged with a different tag. When no other clip is tagged with a different tag, process 1500 proceeds to 1520. Otherwise, process 1500 returns to 1505 which was described above.

At 1520, process 1500 determines the audio level of one or more clips based on the metering information. In the example described above in FIG. 14, the audio level of several clips is determined by summing the clips' audio signals and sending the summed audio signal over the meter bus. Here, as the audio signals are being mixed later in the signal chain, process 1500 estimates the audio level based on the metering information (e.g., audio signal data) extracted from each of the clips. In other words, process 1500 estimates what the audio level would be when two or more audio signals of different clips are added together.

In some embodiments, process 1500 estimates the audio level by adding the power contribution of each clip. One example of such addition is adding about 3 dB for every doubling of equal input sources. For example, if the audio signals of two clips have an identical volume of −10 dB, then the sum of the two signals is estimated to be about 3 dB higher. As such, the estimated sum of the two signals is about −7 dB. If there are four audio signals that have the identical volume, then the sum of these signals will be estimated to be about 6 dB higher, and so on. One example formula for adding sound pressure levels of multiple sound sources is shown below:

$$L_\Sigma = 10 \cdot \log_{10}\left(10^{\frac{L_1}{10}} + 10^{\frac{L_2}{10}} + \ldots + 10^{\frac{L_n}{10}}\right) dB$$

Here, $L_\Sigma$ equals total level, and $L_1, L_2, \ldots L_n$ equal sound pressure level (spl) of the separate sources in dBspl. This formula above translates to about 3 dB per doubling of equal sources. One of ordinary skill in the art would realize that other formulas can be used to differently sum two or more audio signals in order to estimate the audio level.

Returning to FIG. 15, process 1500 displays (at 1525) the audio level of one or more tagged clips based on each estimated audio level. Specifically, process 1500 displays the audio level when playing the mixed audio signal of the composite presentation. Process 1500 then ends.

In some embodiments, process 1500 takes into account other factors when displaying the audio level of clips that has been previously mixed. For example, process 1500 of some embodiments scales (i.e., reduces or increases) the audio level of one or more clips by processing later down the signal chain. In some embodiments, the process estimates the audio level of the mixed clips by identifying what each clip is contributing to the overall mix and numerically estimating the audio level based on the identification and the extracted metering information. For example, when a compound clip is muted, the media editing application should not display audio level of the compound's nested clip as the nested clip is also muted.

In some cases, estimating the audio level has several advantages over routing audio signals over meter buses. For example, this technique can be less computationally expensive than using meter buses. This is because the meter buses do not have to be created and the audio signals of different clips do not have to be routed over these meter buses.

IV. Parameter Controls and Propagation

The media editing application of some embodiments uses metadata to provide user interface controls. In some embodiments, these controls are used to display properties of tagged clips and/or specify parameters that affect the tagged clips. Example of such user interface controls include audio meters, volume controls, different controls for modifying images (e.g., distorting, blurring, changing color), etc.

Figure 16:
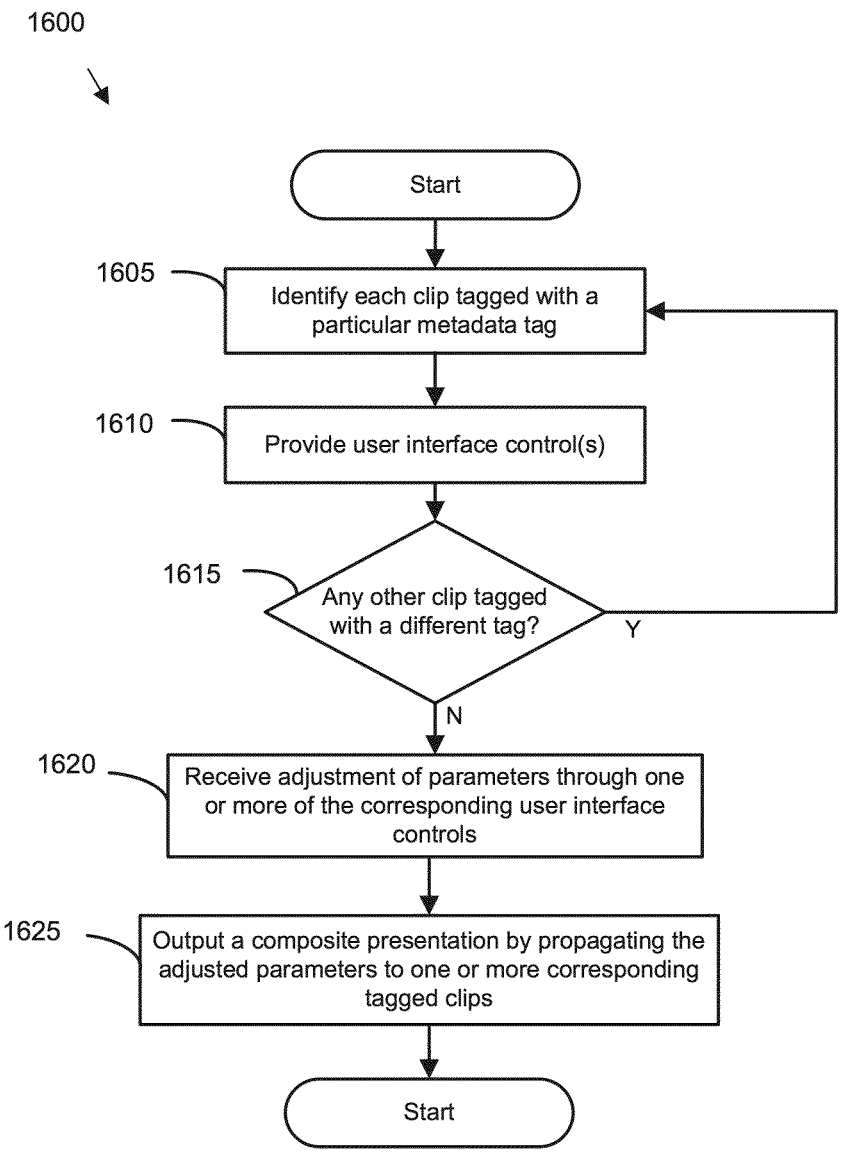
FIG. 16 conceptually illustrates a process that some embodiments use to construct user interface controls based on metadata tags.

FIG. 16 conceptually illustrates a process 1600 that some embodiments use to construct user interface controls based on metadata tags. In some embodiments, process 1600 is performed by a media editing application. As shown, process 1600 identifies (at 1605) each clip tagged with a particular metadata tag. In some embodiments, one or more clips are categorized with a particular role or category. For example, several clips may be assigned one audio role of "Dialog", "Music", or "SFX". Process 1600 then provides one or more user interface controls. Here, the user interface controls are also associated with the tagged clips. That is, the user interface controls are associated so that these controls can be used to display or modify properties of the tagged clips.

Process 1600 then determines (at 1615) whether any other clip is tagged with a different tag. When no other clip is tagged with a different tag, process 1600 proceeds to 1620. Otherwise, process 1600 returns to 1605 which was described above. Process 1600 then receives (at 1620) adjustment of parameters through one or more corresponding user interface controls. Process 1600 then outputs (at 1625) the sequence of clips in the composite presentation by propagating the adjusted parameter to one or more of corresponding tagged clips. Process 1600 then ends.

Some embodiments allow a compound clip to be tagged with the same tag as one or more of the compound clip's inner clips. In some embodiments, the media editing application identifies an appropriate level in a render graph or signal chain to adjust parameters such that the parameters are not readjusted at another level. For example, when the inner clip's tag is the same as the compound clip's outer tag, the media editing application of some embodiments identifies the compound clip's outer tag and performs the adjustment based on the compound clip's outer tag. This prevents the same adjustment being applied at multiple different levels.

Figure 17:
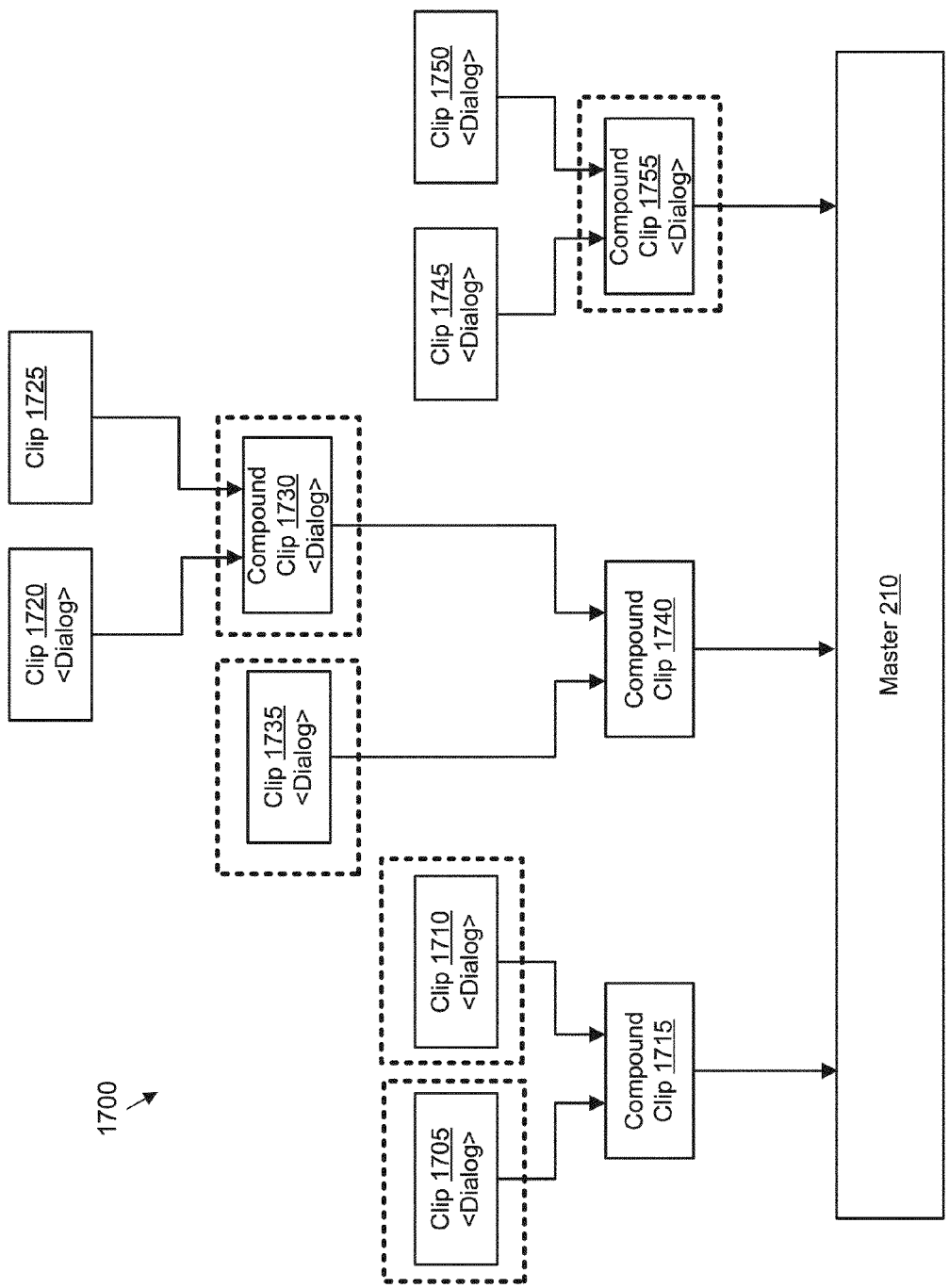
FIG. 17 shows a data flow diagram that conceptually illustrates an example of adjusting parameters of several clips at different levels of a hierarchy, in some embodiments.

FIG. 17 shows a data flow diagram 1700 that conceptually illustrates an example of adjusting parameters of several clips at different levels of a hierarchy, in some embodiments. As shown in FIG. 17, clips 1705 and 1710 are combined for the compound clip 1715. The nested clips 1705 and 1710 are tagged with the "Dialog" tag, while the compound clip 1715 is not tagged with this tag. As the compound clip 1715 is not tagged with the same tag as its nested clips 1705 and 1710, the parameter adjustment occurs for this compound clip at the level of the nested clips. Similarly, the adjustment for compound clip 1740 occurs at the level of the nested clips 1735 and 1730.

In the example illustrated in FIG. 17, the clips 1720 and 1725 are combined for the compound clip 1730. Here, the nested clip 1720 and the compound clip 1730 are tagged with the "Dialog" tag, while the nested clip 1725 is not tagged this tag. As the compound clip 1730 includes the same tag as one of its nested clips (i.e., the clip 1720), the adjustment occurs for this compound clip at the level of the compound clip. Similarly, the adjustment for compound clip 1755 occurs at the level of the compound clip. This is because the nested clips 1745 and 1755 are tagged with the same "Dialog" tag as the compound clip 1755.

In some cases, the compound clip's outer tag can be different from one or more tags of its inner clips. When the compound clip's outer tag is different from the inner clip's tag, the media editing of some embodiments adjusts one set of parameter associated with the inner clip based on the inner clip's tag. Also, the media editing application adjusts another set of parameters associated with the compound clip based on the compound clip's tag.

In some embodiments, the media editing application does not support tagging compound clips. In some such embodiments, the adjustment is only made at the nested clip level. For example, when several nested clips of a compound clip are tagged with a "Dialog" tag, an adjustment to a control relating to the "Dialog" tag will adjust parameters associated with these nested clips and not the combined clip of the compound clip.

V. Outputting Content to Different Tracks

The media editing application of some embodiments allows a composite presentation to be output to different tracks (e.g., different files) based on metadata associated with media content. Outputting content to different tracks is particularly useful because one track can easily be replaced with another track. For example, when audio content is mixed, a movie studio cannot replace a dialog track in one language with another dialog track in another language. With audio content output to different tracks (e.g., audio files), the movie studio can easily replace one dialog track with another such that the dialog is in a different language.

A. Specifying Output Tracks

Figure 18:
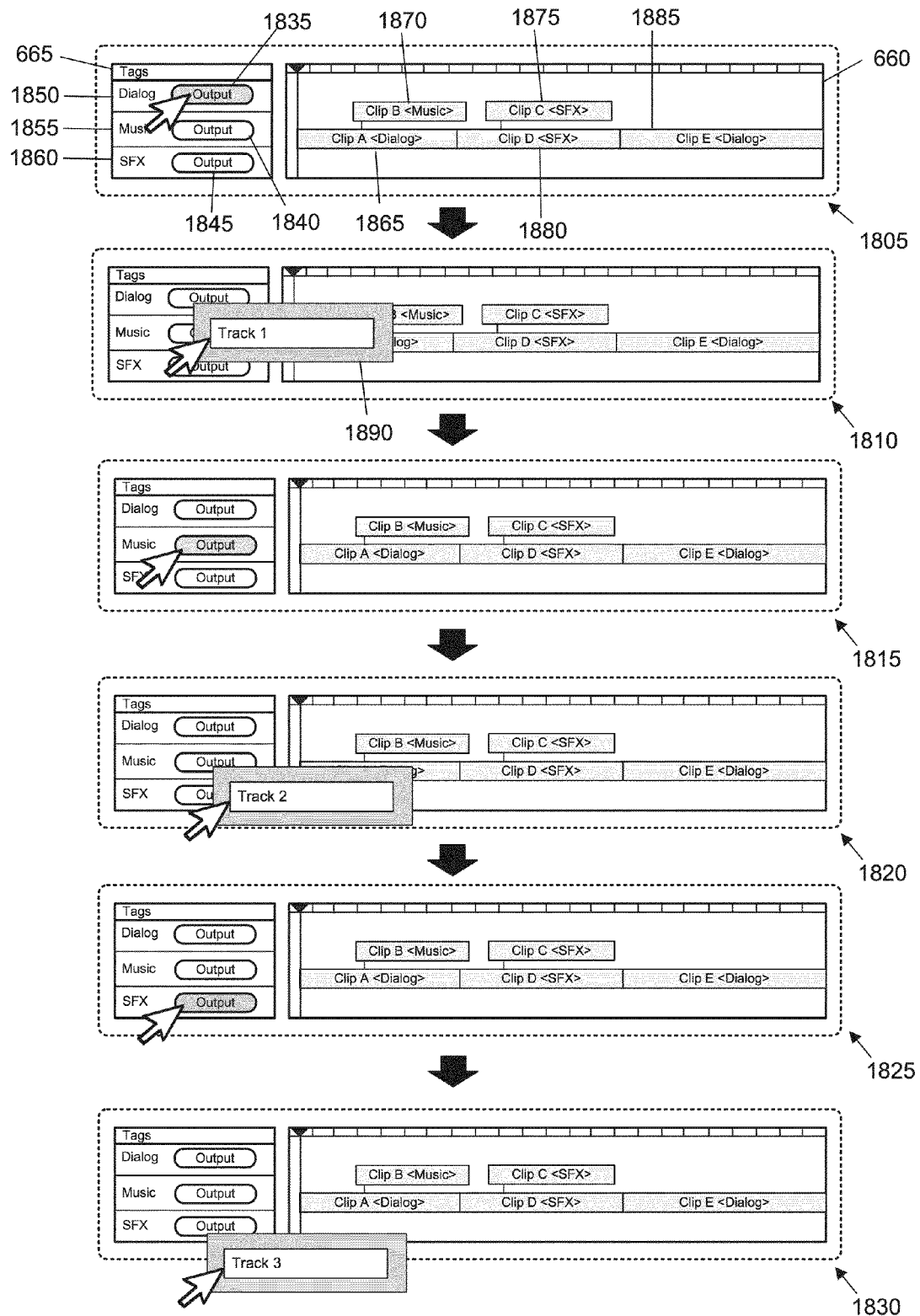
FIG. 18 illustrates how some embodiments output audio content to different tracks based on metadata that is associated with different clips.

FIG. 18 illustrates specifying output tracks for clips based on metadata that is associated the clips. Six operational stages 1805-1830 of the GUI are shown in this figure. In this example, the tag display area 665 includes an output control (1835, 1840, or 1845) for each metadata tag (1850, 1855, or 1860). The output control allows the application's user to specify an output track or stem for each clip associated with a metadata tag.

The first stage 1805 shows the tag display area 665 and the composite display area 660. The tag display area 665 includes a list of metadata tags. This list includes a first metadata tag 1850 specified as "Dialog", a second metadata tag 1855 specified as "Music", and a third metadata tag 1860 specified as "SFX". The first metadata tag 1850 is associated with a first output control 1835, the second metadata tag 1855 with a second output control 1840, and the third metadata tag 1860 with a third output control 1845.

The composite display area 660 displays representations of five clips 1865-1885. The clips 1865 and 1885 are tagged with the first metadata tag 1850, the clip 1870 is tagged with the second metadata tag 1855, and the clips 1875 and 1880 are tagged with the third metadata tag 1860. To specify an output track for the clips 1865 and 1885 that are tagged with the first metadata tag 1850, the user selects the output control 1835. The selection causes a track control 1890 to appear as illustrated in the second stage 1810.

The second stage 1810 illustrates specifying an output track for the clips 1865 and 1885 tagged with the first metadata tag 1850. Specifically, the user specifies the output track to be "Track 1" by using the track control 1890. In some embodiments, the media editing application provides various different options for outputting content. Several example output options include compression type and settings, bit rate, bit size, mono or stereo, name of file, etc. For instance, when outputting an audio containing dialog to a separate file, the media editing application of some embodiments displays different user interface items that allow the application's user to define the output audio clip such as the type of audio file, compression settings, etc.

The third and fourth stages 1815 and 1820 illustrate specifying an output track for the clip 1870 that is tagged with the second metadata tag 1855. To specify the output track, the user selects the output control 1840 that is associated with the second metadata tag 1855. The selection causes the track control 1890 to appear, as illustrated in the fourth stage 1820. In the fourth stage 1820, the application's user specifies the output track to be "Track 2" by using the track control 1890.

The fifth and sixth stages 1825 and 1830 are similar to the previous stages. However, in these stages 1825 and 1830, an output track is specified for the clips 1875 and 1880 that are tagged with the third metadata tag 1860. To specify the output track, the user selects the output control 1845 that is associated with the third metadata tag 1860. The selection causes the track control 1890 to appear, as illustrated in the sixth stage 1830. In the sixth stage 1830, the user specifies the output track to be "Track 3" by using the track control 1890. Once the output tracks are specified for the metadata tags, the user can select an output or export option (not shown) to start the output of clips based on the clip's association with a particular metadata tag.

Figure 19:
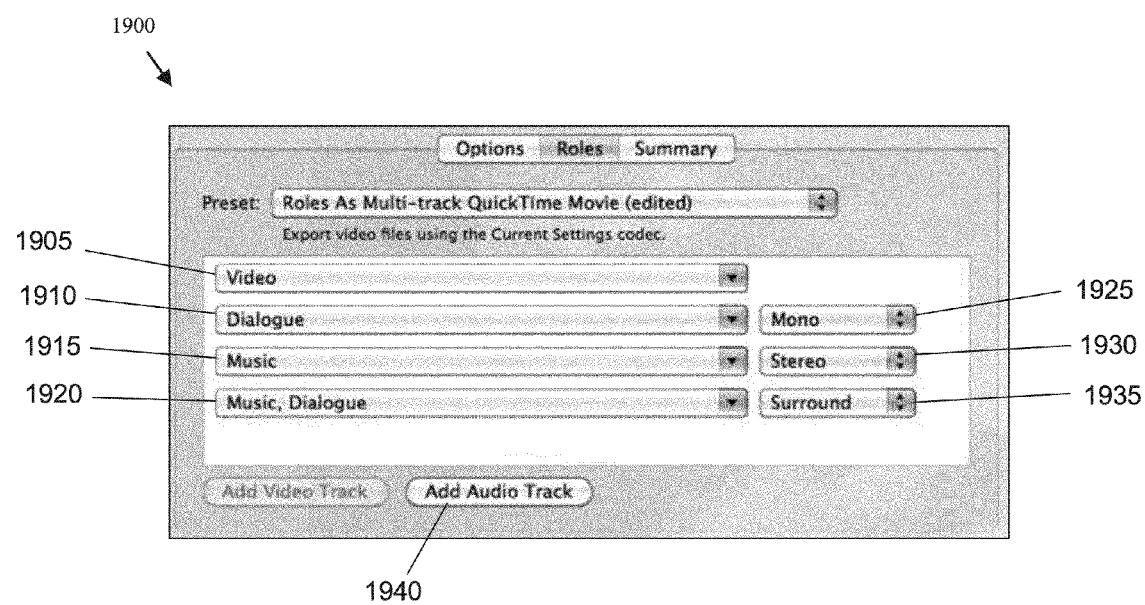
FIG. 19 provides an illustrative example of an output tool for the media editing application.

In the example described above, several output tracks are associated with metadata tags. In some embodiments, the media editing application allows a user to associate metadata tags with output tracks. FIG. 19 provides an illustrative example of an output tool 1900 for the media editing application. As shown, the figure includes several user-selectable items (e.g., drop-down lists) 1905-1920. Each selectable item represents a particular output track for a composite presentation. The user can use any one of these items 1905-1920 to associate one or more roles with a particular track. For instance, two different roles have been specified with the selectable item 1920. This is different from FIG. 18 where a particular output track is associated with one particular metadata tag (e.g., a role).

As shown in FIG. 19, several of these selectable items 1905-1920 are associated with other user interface items 1925-1935. A user of the application select any one of these items 1925-1935 to associate a particular output setting (e.g., mono, stereo, surround) with a corresponding output track. The user can then select a button 1940 to specify a multi-track output for the composite presentation.

B. Performing Multiple Passes

In some embodiments, the media editing application performs multiples passes on a render graph or signal chain to output a composite presentation to different tracks. FIG. 20A shows a signal flow diagram 2000 that conceptually illustrates the problem of outputting the composite presentation to different tracks in a single pass. To simplify the discussion, this signal flow diagram 2000 represents a scenario where only one compound clip 2010 that nests clips 2005 and 2010 is in the composite presentation.

As shown in FIG. 20A, the inner clip 2005 is tagged with a first metadata tag, and inner clip 2010 is tagged with a second metadata tag. The output track for the first metadata tag has been specified as "Track 1", and the output track for the second metadata tag has been specified as "Track 2". Here, the audio signals of clips 2005 and 2010 are mixed as one mixed audio signal for the compound clip 2010. This prevents the audio signal of clip 2005 to be played through one channel, while the audio signal of clip 2010 is being played through another channel. As such, the mixed audio signal cannot be unmixed to output the audio signal of clip 2005 to the first track and the audio signal of clip 2010 to the second track.

Although the composite presentation cannot be unmixed during playback, the media editing application allows the composite presentation to be output to different audio files by performing multiple passes on a render graph or signal chain. FIG. 20B illustrates outputting the composite presentation different audio files. Two example stages 20B05 and 20B10 of the media editing application are illustrated in this figure. Specifically, these stages illustrate performing multiple rendering passes to output the composite presentation to different files.

The first stage 20B05 illustrates a first pass that is performed to output the audio content of clip 2005 to "Track 1". The audio signals of clips 2005 and 2010 are mixed for the compound clip 2020. However, in this first pass, the audio signal of clip 2010 is disabled (e.g., muted or silenced). As the audio clip 2010 is muted, the mixed audio signal includes only the audio signal of the clip 2005.

The second stage 20B10 illustrates a second pass that is performed to output the audio content of clip 2010 to "Track 2". Similar to the first stage 20B05, the audio signals of clips 2005 and 2010 are mixed for the compound clip 2020. However, in this second pass, the audio signal of clip 2005 is disabled (e.g., muted). As the audio clip 2005 is disabled, the mixed audio signal includes only the audio signal of the clip 2010. In some embodiment, the output files include a same duration as the composite presentation. For example, if the duration of the composite presentation (e.g., represented in the composite display area) is one hour and each of the clips 2005 and 2010 includes thirty minutes of sound, then each output file will be one hour in duration with thirty minutes of sound.

In the example described above, multiple rendering passes are performed to output the audio content to different tracks. The media editing application of some embodiments performs these multiple passes simultaneously. In some such embodiments, the media editing application generates multiple copies of one or more render objects (e.g., render graphs, render files) for rendering the sequence of clips in the composite display area. The media editing application then performs the multiple passes such that these passes occur at least partially at the same time. By simultaneous performing these passes, the media editing application saves time in that it does not need to wait for one pass to end to start another. This also saves time as files (e.g., source clips) are read out of disk or loaded in memory once instead of multiple times.

Figure 21:
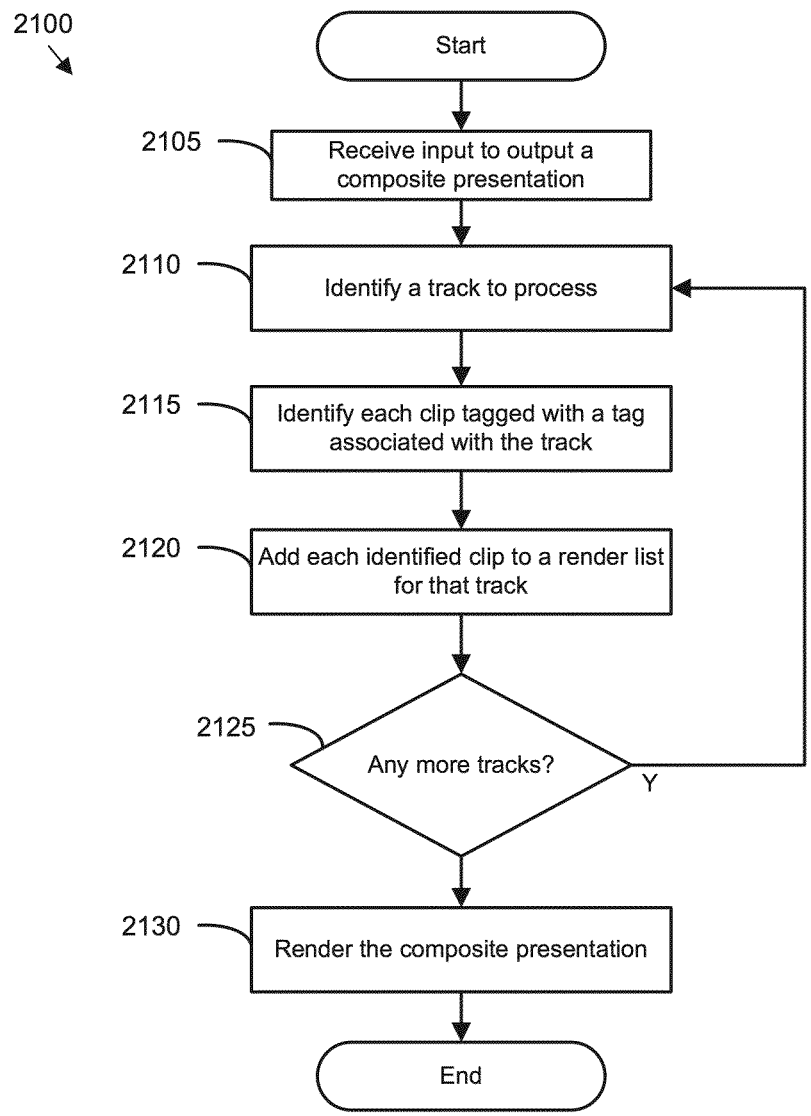
FIG. 21 conceptually illustrates a process that some embodiments use to output a composite presentation based on metadata tags associated with one or more output tracks.

The preceding section described and illustrated various ways to use metadata to facilitate output operations. FIG. 21 conceptually illustrates a process 2100 that some embodiments use to output a composite presentation to different tracks. In some embodiments, process 2100 is performed by a media editing application. As shown, process 2100 receives (at 2105) input to output a composite presentation (e.g., a sequence of clips in the composite display area). Process 2100 then identifies (at 2110) a track to process.

At 2115, process 2100 identifies each clip tagged with a tag (e.g., role) that is associated with the identified track. An example of associating one or more roles to a particular output track is described above by reference to FIG. 19.

Process 2100 then adds (at 2120) each identified clip to a render list for that track. Process 2100 then determines (at 2125) whether there are any more tracks. When there is another track, process 2100 returns to 2110 that was described above. Otherwise, process 2100 renders the composite presentation based on one or more render lists. For example, process 2100 of some embodiments renders the composite presentation by identifying clips in a render list, combining any two or more clips in the list, and outputting the combined clip to a particular track. Process 2100 then ends.

Some embodiments perform variations on process 2100. For example, the operations of process 2100 might be performed by two or more separate processes. Also, the specific operations of the process may not be performed in the exact order shown and described.

VI. Software Architecture

A. Example Media Editing Application

Figure 22:
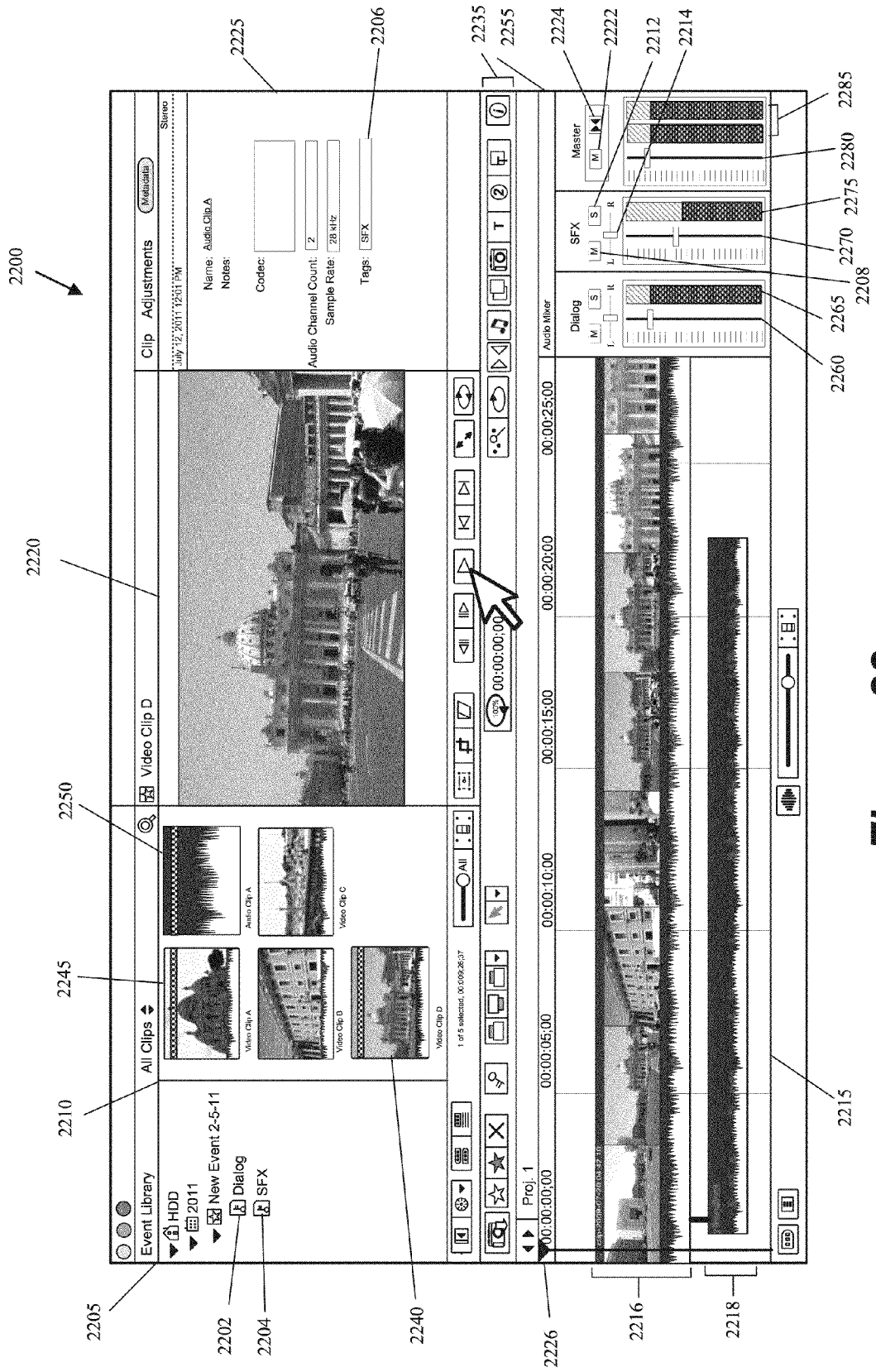
FIG. 22 illustrates a graphical user interface of a media editing application of some embodiments.

Having described several example editing operations above, an example media editing application that implements several editing features will now be described. FIG. 22 illustrates a graphical user interface (GUI) 2200 of a media editing application of some embodiments. One of ordinary skill will recognize that the GUI 2200 is only one of many possible GUIs for such a media editing application. In fact, the GUI 2200 includes several display areas which may be adjusted in size, opened or closed, replaced with other display areas, etc. As shown, the GUI 2200 includes a clip library 2205 (also referred to as an event library), a clip browser 2210 (also referred to as a clip browser), a composite display area 2215, a preview display area 2220, an inspector display area 2225, and a toolbar 2235.

The clip library 2205 includes a set of folder-like or bin-line representations through which a user accesses media clips that have been imported into the media editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera).

Within the clip library 2205, users can group the media clips into "events" or organized folders of media clips. For instance, a user might give the events descriptive names that indicate what kind of media is stored in the event (e.g., the "New Event 2-5-11" event shown in clip library 2205 might be renamed "European Vacation" as a descriptor of the content). In some embodiments, the media files corresponding to these clips are stored in a file storage structure that mirrors the folders shown in the clip library.

In some embodiments, the clip library 2205 enables users to perform various clip management actions. These clip management actions include moving clips between bins (e.g., events), creating new bins, merging two bins together, duplicating bins (which, in some embodiments, create a duplicate copy of the media to which the clips in the bin correspond), deleting bin, etc.

As shown in FIG. 22, the clip library 2205 displays several keywords 2202 and 2204. To categorize a clip or associate the clip with a particular keyword, the application's user can drag and drop the clip onto the particular keyword. The same technique used in some embodiments to associate multiple clips with the particular keyword by simultaneously dragging and dropping the clips onto the keyword. In some embodiments, the keywords 2202 and 2204 are represented as keyword collections (e.g., keyword bin or keyword folder) in the clip library 2205. That is, the keyword collection acts a virtual bin or virtual folder that the user can drag and drop items onto in order to create keyword associations. In some embodiments, upon selection of a keyword collection, the media editing application filters the clip browser 2210 to only display those clips associated with a particular keyword of the keyword collection.

The clip browser 2210 allows the user to view clips from a selected folder or collection (e.g., an event, a sub-folder, etc.) of the clip library 2205. In the example illustrated in FIG. 22, the collection "New Event 2-5-11" is selected in the clip library 2205, and the clips belonging to that folder are displayed in the clip browser 2210. Some embodiments display the clips as thumbnail filmstrips (i.e., filmstrip representations). These thumbnail filmstrips are similar to the representations in the composite display area 2215.

By moving a position indicator (e.g., through a cursor, through the application's user touching a touch screen) over one of the thumbnails, the user can skim through the clip. For example, when the user places the position indicator at a particular horizontal location within the thumbnail filmstrip, the media editing application associates that horizontal location with a time in the associated media file, and displays the image from the media file for that time. In addition, the user can command the application to play back the media file in the thumbnail filmstrip. In some embodiments, the selection and movement is received through a user selection input such as input received from a cursor controller (e.g., a mouse, touchpad, trackpad, etc.), from a touchscreen (e.g., a user touching a user interface (UI) item on a touchscreen), from the keyboard, etc. In some embodiments, one example of such a user selection input is the position indicator that indicates the user's interaction (e.g., with the cursor, the touchscreen, etc.). The term user selection input is used throughout this specification to refer to at least one of the preceding ways of making a selection, moving a control, or pressing a button through a user interface.

In the example illustrated in FIG. 22, the thumbnails for the clips in the clip browser 2210 display an audio waveform underneath the clip that represents the audio of the media file. In some embodiments, as a user skims through or plays back the thumbnail filmstrip, the audio portion plays as well. Many of the features of the clip browser are user-modifiable. For instance, the user can modify one or more of the thumbnail size, the percentage of the thumbnail occupied by the audio waveform, whether audio plays back when the user skims through the media files, etc. In addition, some embodiments enable the user to view the clips in the clip browser 2210 in a list view. In this view, the clips are presented as a list (e.g., with clip name, duration, metadata, etc.). Some embodiments also display a selected clip from the list in a filmstrip view at the top of the clip browser 2210 so that the user can skim through or playback the selected clip. The clip browser in some embodiments allows users to select different ranges of a media clip and/or navigate to different sections of the media clip.

In some embodiments, the media editing application displays content differently based on their association with one or more metadata tags (e.g., keywords). This allows users to quickly assess a large group of media clips and see which ones are associated or not associated with any metadata tags. For example, in FIG. 22, a horizontal bar is displayed across each of the clips 2240-2250. This indicates to the application's user that these clips are tagged with one or more metadata tags.

In some embodiments, the media editing application allows the user to tag a portion of a clip with a metadata tag. To associate a metadata tag with a portion of a clip, the user can select the portion of the clip (e.g., using a range selector on a clip's filmstrip representation in the clip browser 2210), and drag and drop the selected portion onto the metadata tag (e.g., 2202 or 2204). For example, a user can specify that an audio clip includes crowd noise starting at one point in time and ending at another point, and then tag that range as "crowd noise". When a portion of a clip is associated with a metadata tag, the media editing application of some embodiments indicates this by marking a portion of the clip's representation in the clip browser 2210. For example, a horizontal bar is displayed across only the portion the clip's filmstrip representation associated with a particular metadata tag, in some embodiments.

The composite display area 2215 provides a visual representation of a composite presentation (or project) being created by the user of the media editing application. As mentioned above, the composite display area 2215 displays one or more geometric shapes that represent one or more media clips that are part of the composite presentation. In some embodiments, the composite display area 2215 spans a displayed timeline 2226 which displays time (e.g., the elapsed time of clips displayed on the composite display area). The composite display area 2215 of some embodiments includes a primary lane 2216 (also called a "spine", "primary compositing lane", or "central compositing lane") as well as one or more secondary lanes (also called "anchor lanes"). The spine represents a primary sequence of media which, in some embodiments, does not have any gaps. The clips in the anchor lanes are anchored to a particular position along the spine (or along a different anchor lane). Anchor lanes (e.g., the anchor lane 2218) may be used for compositing (e.g., removing portions of one video and showing a different video in those portions), B-roll cuts (i.e., cutting away from the primary video to a different video whose clip is in the anchor lane), audio clips, or other composite presentation techniques.

The user can select different media clips from the clip browser 2210, and drag and drop them into the composite display area 2215 in order to add the clips to a composite presentation represented in the composite display area 2215. Alternatively, the user can select the different media clips and select a shortcut key, a tool bar button, or a menu item to add them to the composite display area 2215. Within the composite display area 2215, the user can perform further edits to the media clips (e.g., move the clips around, split the clips, trim the clips, apply effects to the clips, etc.). The length (i.e., horizontal expanse) of a clip in the composite display area is a function of the length of the media represented by the clip. As the timeline 2226 is broken into increments of time, a media clip occupies a particular length of time in the composite display area. As shown, in some embodiments, the clips within the composite display area are shown as a series of images or filmstrip representations. The number of images displayed for a clip varies depending on the length of the clip (e.g., in relation to the timeline 2226), as well as the size of the clips (as the aspect ratio of each image will stay constant). As with the clips in the clip browser, the user can skim through the composite presentation or play back the composite presentation. In some embodiments, the playback (or skimming) is not shown in the composite display area's clips, but rather in the preview display area 2220.

The preview display area 2220 (also referred to as a "viewer") displays images from media files which the user is skimming through, playing back, or editing. These images may be from a composite presentation in the composite display area 2215 or from a media clip in the clip browser 2210. In the example of FIG. 22, the user is playing the composite presentation in the composite display area 2215. Hence, an image from the start of the composite presentation is displayed in the preview display area 2220. As shown, some embodiments will display the images as large as possible within the display area while maintaining the aspect ratio of the image.

The inspector display area 2225 displays detailed properties about a selected item and allows a user to modify some or all of these properties. The selected item might be a clip, a composite presentation, an effect, etc. As shown in FIG. 22, the inspector display area 2225 displays information about the audio clip 2250. To display the information, the application's user might have selected the audio clip 2250 from the clip browser 2210. In this case, the information about the selected media clip 2250 includes name, notes, codec, audio channel count, and sample rate. However, depending on the type of media clip, the inspector display area 2225 can display other information such as file format, file location, frame rate, date created, etc. In some embodiments, the inspector display area 2225 displays different metadata tags associated with a clip. For example, the inspector display area 2225 includes a text box 2206 for displaying and/or modifying one or more metadata tags.

The toolbar 2235 includes various selectable items for editing, modifying items that are displayed in one or more display areas, etc. The illustrated toolbar 2235 includes items for video effects, visual transitions between media clips, photos, titles, generators and backgrounds, etc. The toolbar 2235 also includes selectable items for media management and editing. Selectable items are provided for adding clips from the clip browser 2210 to the composite display area 2215. In some embodiments, different selectable items may be used to add a clip to the end of the spine, add a clip at a selected point in the spine (e.g., at the location of a playhead), add an anchored clip at the selected point, perform various trim operations on the media clips in the composite display area, etc. The media management tools of some embodiments allow a user to mark selected clips as favorites, among other options.

The audio mixer 2255 provides different audio mixing tools that the application's user can use to define the output audio of the composite presentation represented in the composite display area 2215. The audio mixer 2255 includes several level controls (2260, 2270, and 2280) and several audio meters (2265, 2275, and 2285). The level control 2280 and the audio meters 2285 are related to the master that represents the output audio. Specifically, the master's level control 2280 raises or lowers the combined output level of all sequence of clips in the composite display area at the same time. That is, the control 2280 affects output levels during playback, export to a file, etc. Hence, the level control 2280 adjusts the level of the output audio, and the meters 2285 display that audio level. In the example illustrated in FIG. 22, the audio meters 2285 include a first meter that represents the left channel of the output audio, and a second meter that represents the right channel of the output audio. In some embodiments, the master includes an audio meter for each output track (e.g., channel, file) specified for the sequence. For example, when the sequence of the clips has four output tracks, there are four corresponding audio meters for the master in the audio mixer 2255. Several examples of specifying different output tracks by using metadata tags are described above in Section V.

As shown in FIG. 22, the audio meters 2285 provide visual representations of the level of the output audio. Specifically, each meter displays a fluctuating or moving bar in accord with the audio level. In some embodiments, the fluctuating bar changes color when the audio level exceeds a particular threshold. For example, the color of the bar may change from one color to another color when the volume goes over a predetermined threshold decibel value.

The level control 2260 and the audio meter 2265 are related to the keyword 2202. The level control 2270 and the audio meter are related to the keyword 2204. In some embodiments, the audio meters 2265 and 2275 display the audio levels of the clips associated with the corresponding keywords. For example, when a clip tagged with "Dialog" is being output, the audio meter 2265 fluctuates to indicate the level of the clip's audio. Similarly, the audio level control 2260 controls the audio level of each clip that is tagged with the keyword 2202, and the audio level control 2270 controls the audio level of each clip tagged with the keyword 2204.

As shown in FIG. 22, the level controls 2260, 2270, and 2280 are represented as channel faders, while the audio meters 2265, 2275, and 2285 are represented as fluctuating bars. Alternatively, the media editing application of some embodiments provides different types of controls. For example, any one of the level controls can be provided as a dial knob that is rotated to adjust the gain or volume of each clip that is tagged with a particular keyword. Also, in different embodiments, the audio levels at different instances in time are represented as a graph, numerically by displaying different decibels, etc. In some embodiment, the audio controls (e.g., audio level controls 2260 and 2270) are not used to control absolute audio levels but are used to make relative adjustments. In some such embodiments, the media editing application provides a wheel or a knob that can be turned infinitely to add or subtract gain to all clips tagged with a particular metadata tag.

In the example illustrated in FIG. 22, the audio mixer 2255 includes other controls associated with the master and the keywords 2202 and 2204. For example, the keyword 2204 includes (1) a mute button 2208 for muting all clips associated with the keyword, (2) a solo button 2212 for muting all other clips except those associated with the keyword, and (3) a pan control 2214 for controlling the spread of audio. The same set of controls is provided for the keyword 2202. In addition, the master includes a mute button 2222 for muting all channels and a downmix button 2224 for mixing down all output channels to a single stereo output. In some embodiments, when the downmix is activated, all audio outputs in the composite display area's sequence are mixed down to stereo during playback, export to one or more files, etc. Instead of, or in conjunction with these controls, the media editing application of some embodiments provides other controls such as two separate controls for controlling the gain and the volume, two separate faders or knobs for individually controlling the audio levels of left and right channels, a record button for recording the audio, etc.

One or ordinary skill will also recognize that different display areas shown in the GUI 2200 is one of many possible configurations for the GUI of some embodiments. For instance, in some embodiments, the presence or absence of many of the display areas can be toggled through the GUI (e.g., the inspector display area 2225, clip library 2205, etc.). In addition, some embodiments allow the user to modify the size of the various display areas within the GUI. For instance, when the mixer 2255 is removed, the composite display area 2215 can increase in size to include that area. Similarly, the preview display area 2220 increases in size when the inspector display area 2225 is removed.

B. Example Software Architecture

Figure 23:
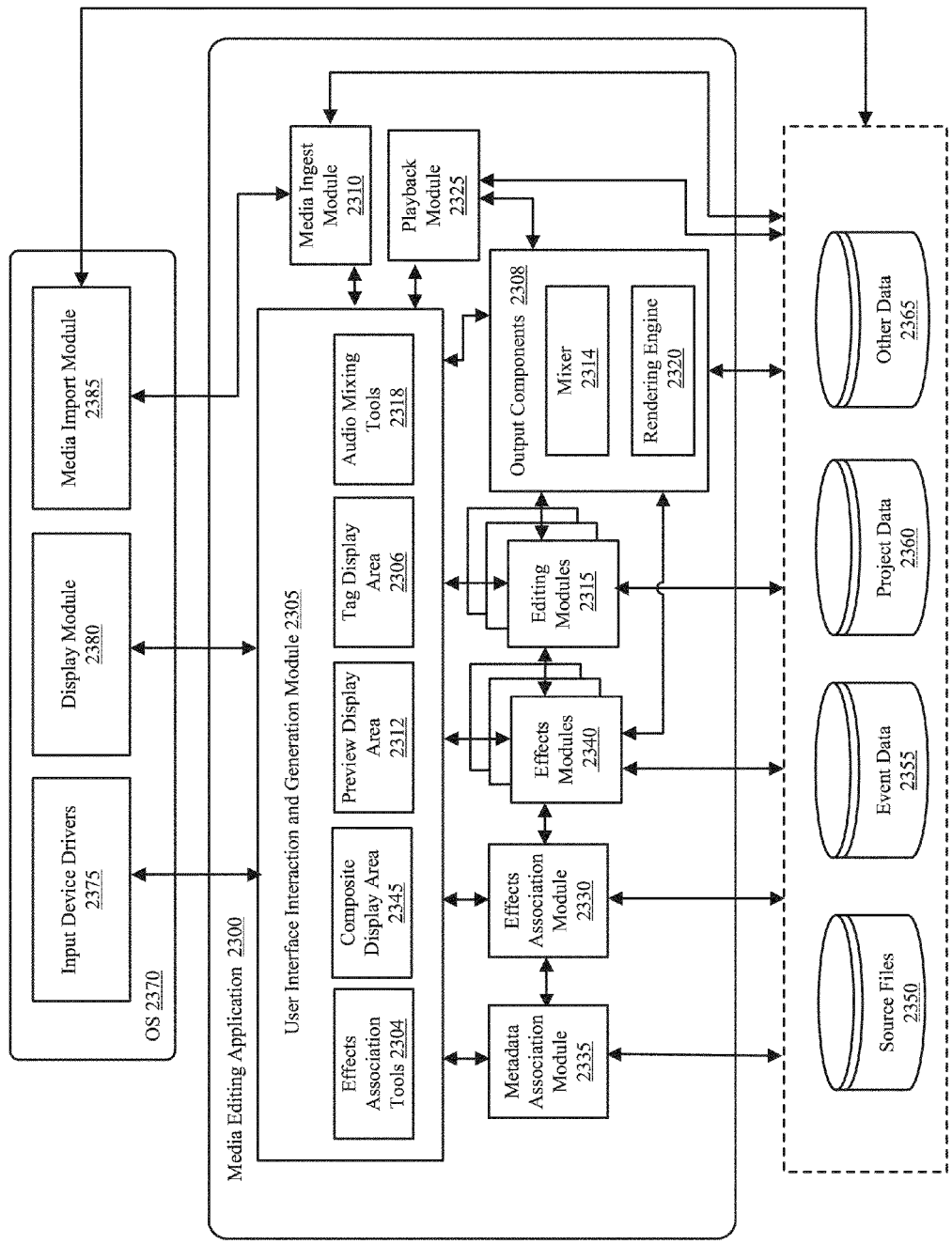
FIG. 23 conceptually illustrates the software architecture of a media editing application of some embodiments.

In some embodiments, the processes described above are implemented as software running on a particular machine, such as a computer or a handheld device, or stored in a machine readable medium. FIG. 23 conceptually illustrates the software architecture of a media editing application 2300 of some embodiments. In some embodiments, the media editing application is a stand-alone application or is integrated into another application, while in other embodiments the application is implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 2300 includes a user interface (UI) interaction and generation module 2305, a media ingest module 2310, editing modules 2315, effects modules 2340, output components 2308, a playback module 2325, a metadata association module 2335, and an effects association module 2330.

The figure also illustrates stored data associated with the media editing application: source files 2350, event data 2355, project data 2360, and other data 2365. In some embodiments, the source files 2350 store media files (e.g., video files, audio files, combined video and audio files, etc.) imported into the application. The source files 2350 of some embodiments also store transcoded versions of the imported files as well as analysis data (e.g., people detection data, shake detection data, color balance data, etc.). The event data 2355 stores the events information used by some embodiments to populate the thumbnails view (e.g., in a clip browser). The event data 2355 may be a set of clip object data structures stored as one or more SQLite database (or other format) files in some embodiments. The project data 2360 stores the project information used by some embodiments to specify a composite presentation in the composite display area 2345. The project data 2360 may also be a set of clip object data structures stored as one or more SQLite database (or other format) files in some embodiments.

In some embodiments, the four sets of data 2350-2365 are stored in a single physical storage (e.g., an internal hard drive, external hard drive, etc.). In some embodiments, the data may be split between multiple physical storages. For instance, the source files might be stored on an external hard drive with the event data, project data, and other data on an internal drive. Some embodiments store event data with their associated source files and render files in one set of folders, and the project data with associated render files in a separate set of folders.

FIG. 23 also illustrates an operating system 2370 that includes input device driver(s) 2375, display module 2380, and media import module 2385. In some embodiments, as illustrated, the input device drivers 2375, display module 2380, and media import module 2385 are part of the operating system 2370 even when the media editing application 2300 is an application separate from the operating system 2370.

The input device drivers 2375 may include drivers for translating signals from a keyboard, mouse, touchpad, tablet, touchscreen, etc. A user interacts with one or more of these input devices, each of which send signals to its corresponding device driver. The device driver then translates the signals into user input data that is provided to the UI interaction and generation module 2305.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface.

However, in some embodiments, objects in the graphical user interface can also be controlled or manipulated through other controls, such as touch control. In some embodiments, touch control is implemented through an input device that can detect the presence and location of touch on a display of the input device. An example of a device such functionality is a touch screen device (e.g., as incorporated into a smart phone, a tablet computer, etc.). In some embodiments, with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2380 translates the output of a user interface for a display device. That is, the display module 2380 receives signals (e.g., from the UI interaction and generation module 2305) describing what should be displayed and translates these signals into pixel information that is sent to the display device. The display device may be an LCD, plasma screen, CRT monitor, touchscreen, etc.

The media import module 2385 receives media files (e.g., audio files, video files, etc.) from storage devices (e.g., external drives, recording devices, etc.) through one or more ports (e.g., a USB port, Firewire port, etc.) of the device on which the application 2300 operates and translates this media data for the media editing application or stores the data directly onto a storage of the device.

The UI interaction and generation module 2305 of the media editing application 2300 interprets the user input data received from the input device drivers 2375 and passes it to various modules, including the editing modules 2315, the rendering engine 2320, the playback module 2325, the metadata association modules 2335, and the effects association module 2330. The UI interaction and generation module 2305 also manages the display of the UI, and outputs this display information to the display module 2380. This UI display information may be based on information from the editing modules 2315, the playback module 2325, and the data 2350-2365. In some embodiments, the UI interaction and generation module 2305 generates a basic GUI and populates the GUI with information from the other modules and stored data.

As shown, the UI interaction and generation module 2305 of some embodiments provides a number of different UI elements. In some embodiments, these elements include a tag display area 2306, a composite display area 2345, an effects association tool 2304, an audio mixing tool 2318, and a preview display area 2312. All of these UI elements are described in detail above by reference to FIG. 22.

The media ingest module 2310 manages the import of source media into the media editing application 2300. Some embodiments, as shown, receive source media from the media import module 2385 of the operating system 2370. The media ingest module 2310 receives instructions through the UI interaction and generation module 2305 as to which files should be imported, then instructs the media import module 2385 to enable this import (e.g., from an external drive, from a camera, etc.). The media ingest module 2310 stores these source files 2350 in specific file folders associated with the application. In some embodiments, the media ingest module 2310 also manages the creation of event data structures upon import of source files and the creation of the clip and asset data structures contained in the events. In some embodiments, the media ingest module 2310 tags the imported media clip with one or more metadata tags. For example, when a media clip is imported from a music library, the media ingest module 2310 might tag the clip with a "Music" tag. Alternatively, when the media clip is imported from a folder named "Dialog", the media ingest module 2310 might tag the clip with a "Dialog" tag.

The editing modules 2315 include a variety of modules for editing media in the clip browser as well as in the composite display area. The editing modules 2315 handle the creation of projects, addition and subtraction of clips from projects, trimming or other editing processes within the composite display area, or other editing processes. In some embodiments, the editing modules 2315 create and modify project and clip data structures in both the event data 2355 and the project data 2360.

The effects association module 2330 of some embodiments associates an effect with a metadata tag. In some embodiments, the effect association module 2330 defines an effect chain with one or more effects for the metadata tag. The effect modules 2340 represent the various different effects, filters, transitions, etc. As mentioned above, there are many different effects or filters that can be associated with metadata to facilitate editing operations. Although this list is non-exhaustive, several example audio effects include different equalizers for modifying the signal strength of a clip within specified frequency ranges, a compressor/limiter for reducing the clip's dynamic range by attenuating parts of the audio signal above a particular threshold, an echo effect for creating an echo sound, and a reverb effect for creating a reverberation effect that emulates a particular acoustic environment. Several example video effects or image effects include color filters that operate on color values, different filters that sharpen, stylize, distort, or blur an image, and fade-in/fade-out effects for creating transitions between scenes. Several of these effect modules are associated with one or more settings or properties that the application's user can specify to edit media content.

In some embodiments, the output components 2308 generate the resulting output composite presentation based on one or more clips in the composite display area 2345. As shown, the output components 2308 include a rendering engine 2320 and a mixer 2314. However, depending on the type of output, the media editing application of some embodiments includes other component (e.g., encoders, decoders, etc). The rendering engine 2320 handles the rendering of images for the media editing application. In some embodiments, the rendering engine 2320 manages the creation of images for the media editing application. When an image is requested by a destination within the application (e.g., the playback module 2325) the rendering engine 2320 outputs the requested image according to the project or event data. The rendering engine 2320 retrieves the project data or event data that identifies how to create the requested image and generates a render graph that is a series of nodes indicating either images to retrieve from the source files or operations to perform on the source files. In some embodiments, the rendering engine 2320 schedules the retrieval of the necessary images through disk read operations and the decoding of those images.

In some embodiments, the rendering engine 2320 performs various operations to generate an output image. In some embodiments, these operations include blend operations, effects (e.g., blur or other pixel value modification operations), color space conversions, resolution transforms, etc. In some embodiments, one or more of these processing operations are actually part of the operating system and are performed by a GPU or CPU of the device on which the application 2300 operates. The output of the rendering engine (a rendered image) may be stored as render files in storage 2365 or sent to a destination for additional processing or output (e.g., playback).

In some embodiments, the mixer 2314 receives several audio signals of different clips and outputs a mixed audio signal. The mixer 2314 of some embodiments is utilized in number of different instances during the non-linear editing process. For example, the mixer may be utilized in generating a composite presentation from multiple different clips. The mixer can also act as the master to output a mixed audio signal, as described in many of the examples above. In some embodiments, the media editing application includes different types of mixers for mixing audio. For example, the media editing application can include a first mixer for mixing one type of audio file and a second mixer for mixing another type of audio file.

The playback module 2325 handles the playback of images (e.g., in a preview display area 2312 of the user interface). Some embodiments do not include a playback module and the rendering engine directly outputs its images for integration into the GUI, or directly to the display module 2380 for display at a particular portion of the display device.

In some embodiments, the metadata association module 2335 associates clips with metadata tags. Different embodiments provide different ways of associating media clips with metadata tags. In some embodiments, the metadata tags indicate pre-defined categories (e.g., dialog, music) that an editor can select to categorize different clips. Instead of, or in conjunction with, these categories, some embodiments allow the editor to specify one or more keywords to associate with the media clips. For instance, in some such embodiments, the media editing application provides a keyword association tool that displays different keywords for tagging the media content. To tag a clip, the application's user drags and drops the clip onto a particular keyword in the keyword association tool. The same technique is used in some embodiments to associate multiple clips by simultaneously dragging and dropping the clips onto the particular keyword.

In addition, some embodiments automatically associate one or more metadata tags with a media clip. In some such embodiments, this automatic association is based on a number of different factors including the source of the media clip (e.g., based on the library or camera from which the clip was imported), based on an analysis of the media clip (e.g., based on color balance analysis, image stabilization analysis, audio channel analysis, etc.). For example, the media editing application might tag one set of clips from a music library as "Music" and tag another set of clips from a sound effects library as "SFX". Alternatively, the automatic association can be based on an analysis of the media content (e.g., based on color balance analysis, image stabilization analysis, audio channel analysis, people analysis, etc.). As mentioned above, in some embodiments, the media ingest module 2310 can also perform at least some of the metadata association task when importing media content into the media editing application 2300. In some embodiments, the media editing application includes one or more analysis modules for analyzing the number of people (e.g., one person, two persons, group, etc.) in a clip and/or a type of shot (e.g., a close-up, medium, or wide shot). Other types of analysis modules can include image stabilization analysis modules (e.g., for camera movements), color balance analysis modules, audio analysis modules (e.g., for mono, stereo, silent channels), metadata analysis, etc. In some embodiments, metadata tags represent metadata that are embedded in media content. For example, some video cameras embed frame rate, creation date, and encoding info into video clips that they capture. In addition some devices embed other metadata such as location data, audio channel count, sample rate, file type, camera type, exposure info, etc.

While many of the features of the media editing application 2300 have been described as being performed by one module (e.g., the UI interaction and generation module 2305, the media ingest module 2310, etc.), one of ordinary skill in the art will recognize that the functions described herein might be split up into multiple modules. Similarly, functions described as being performed by multiple different modules might be performed by a single module in some embodiments (e.g., the playback module 2325 might be part of the UI interaction and generation module 2305).

C. Example Data Structure

Figure 24:
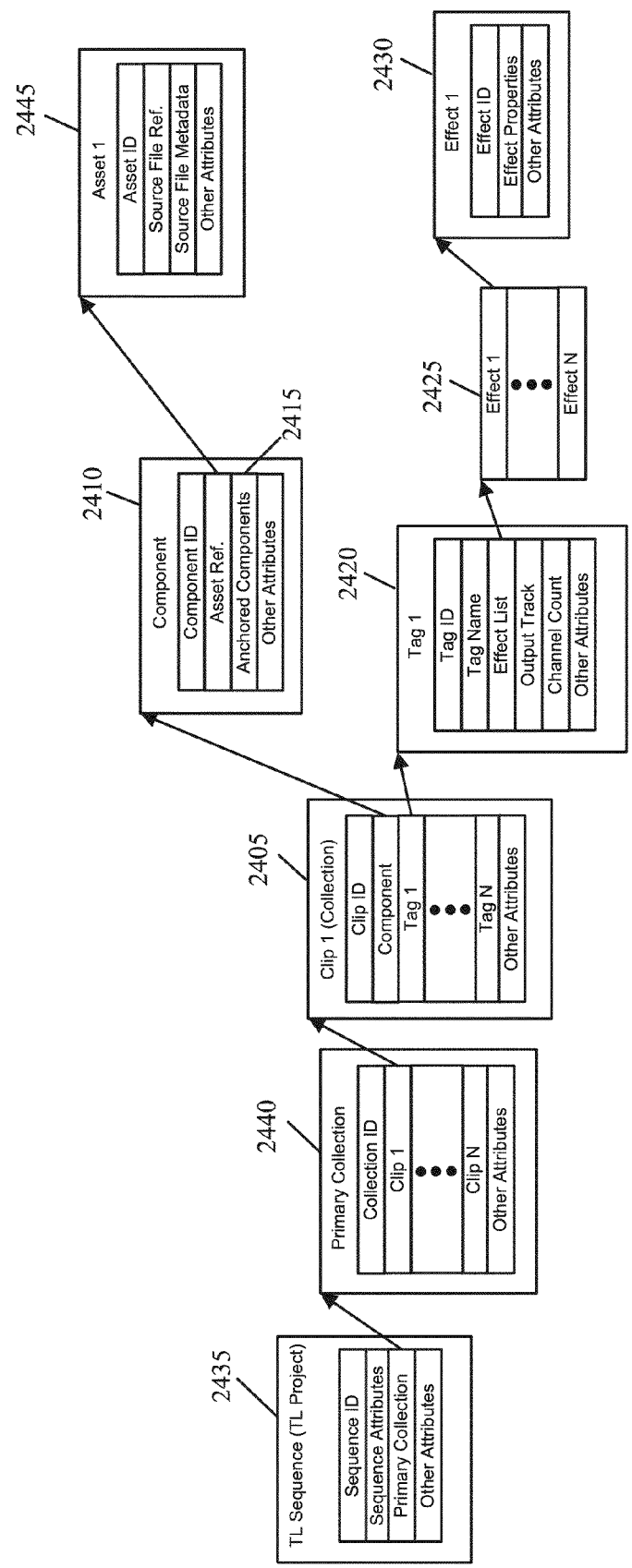
FIG. 24 conceptually illustrates example data structures for several objects associated with a media editing application of some embodiments.

FIG. 24 conceptually illustrates example data structures for several objects associated with the media editing application of some embodiments. Specifically, this figure illustrates a sequence 2435 that references a primary collection data structure 2440. Here, the primary collection data structure 2440 is in itself a group of one or more clip objects or collection objects. As shown, the figure illustrates (1) a clip object 2405, (2) a component object 2410, (3) a tag object 2420, (4) an effect object 2430, (5) the sequence object 2435, (6) the primary collection object 2440, and (7) an asset object 2445.

As shown in FIG. 24, the sequence 2435 includes a sequence ID and sequence attributes. The sequence ID identifies the sequence 2435. In some embodiments, the application's user sets the sequence attributes for the project represented in the composite display area. For example, the user might have specified several settings that correspond to these sequence attributes when creating the project. The sequence 2435 also includes a pointer to a primary collection 2440.

The primary collection 2440 includes the collection ID and the array of clips. The collection ID identifies the primary collection. The array references several clips (i.e., clip 1 to clip N). These represent clips or collections that have been added to the composite display area. In some embodiments, the array is ordered based on the locations of media clips in the composite display area and only references clips in the primary lane of the primary collection. An example of one or more clips in the primary lane of the composite display area is described above by reference to FIG. 22.

The clip object 2405 or collection object, in some embodiments, is an ordered array of clip objects. The clip object 2405 references one or more component clips (e.g., the component object 2410) in the array. In addition, the clip object 2405 stores a clip ID that is a unique identifier for the clip object. In some embodiments, the clip object 2405 is a collection object that can reference component clip objects as well as additional collection objects. An example of such collection object is a compound clip that references multiple different clips. In some embodiments, the clip object 2405 or collection object only references the video component clip in the array, and any additional components (generally one or more audio components) are then anchored to that video component.

As shown in FIG. 24, the clip object 2405 is associated with one more metadata tags (i.e., tags 1-N). In some embodiments, these tags represent those that are associated by the application's user. Alternatively, one or more of these tags can be tags specified by the media editing application. For example, when a media clip is imported from a music library, the media editing application might tag the clip with a "Music" tag. Alternatively, when the media clip is imported from a folder named "Dialog", the media editing application might tag the clip with a "Dialog" tag.

The component object 2410 includes a component ID, an asset reference, and anchored components. The component ID identifies the component. The asset reference of some embodiments uniquely identifies a particular asset object. In some embodiments, the asset reference is not a direct reference to the asset but rather is used to locate the asset when needed. For example, when the media editing application needs to identify a particular asset, the application uses an event ID to locate an event object (not shown) that contains the asset, and then the asset ID to locate the particular desired asset. Several examples of clips associated with an event or an event folder are described above by reference to FIG. 22.

In some embodiments, the clip object 2405 only stores the video component clip in its array, and any additional components (generally one or more audio components) are then anchored to that video component. This is illustrated in FIG. 24 as the component object 2410 includes a set of one or more anchored components 2415 (e.g., audio components). In some embodiments, each component that is anchored to another clip or collection stores an anchor offset that indicates a particular instance in time along the range of the other clip or collection. That is, the anchor offset may indicate that the component is anchored x number of seconds and/or frames into the other clip or collection. In some embodiments, the offset refers to the trimmed ranges of the clips.

As shown, the asset object 2445 includes an asset ID, reference to a source file, and a set of source file metadata. The asset ID identifies the asset, while the source file reference is a pointer to the original media file. The set of source file metadata is different for different media clips. Examples of source file metadata include the file type (e.g., audio, video, movie, still image, etc.), the file format (e.g., ".mov", ".avi", etc), different video properties, audio properties, etc.

In the example illustrated in FIG. 24, the tag object 2420 includes a tag ID that identifies the tag, a tag name that represents the metadata tag, and an effect list 2425 that represents the one or more effects associated with the metadata tag. In some embodiments, the tag object 2425 includes an output track that represents the output track associated with the metadata tag. Several examples of such output track are described above by reference to FIGS. 18-20.

As shown in FIG. 24, the effects object 2430 includes an effect ID and effect properties. The effect ID identifies the effect. In some embodiments, the effect properties are based on parameters specified using an effect properties tool. The properties tool can include different user interface items to specify different parameters or settings for the effect.

One of ordinary skill will also recognize that the data structures shown in FIG. 24 are just a few of the many different possible configurations for implementing the editing features described above. For instance, in some embodiments, instead of multiple tags per clip, only one tag (e.g., role, category) is assigned to the clip. For example, several clips may be assigned one audio role of "Dialog", "Music", or "SFX". When multiple tags per clip are supported, the media editing application applies different sets of effects in parallel. For example, if a clip is tagged with both first and second tags, the media editing application applies a first set of effects associated with the first tag, and applies a second set of effects in parallel with the first set of effect. Also, in the example illustrated in FIG. 24, the tag object 2420 can be associated with the component object 2410 or the asset object 2445 instead of the clip object 2405.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 25:
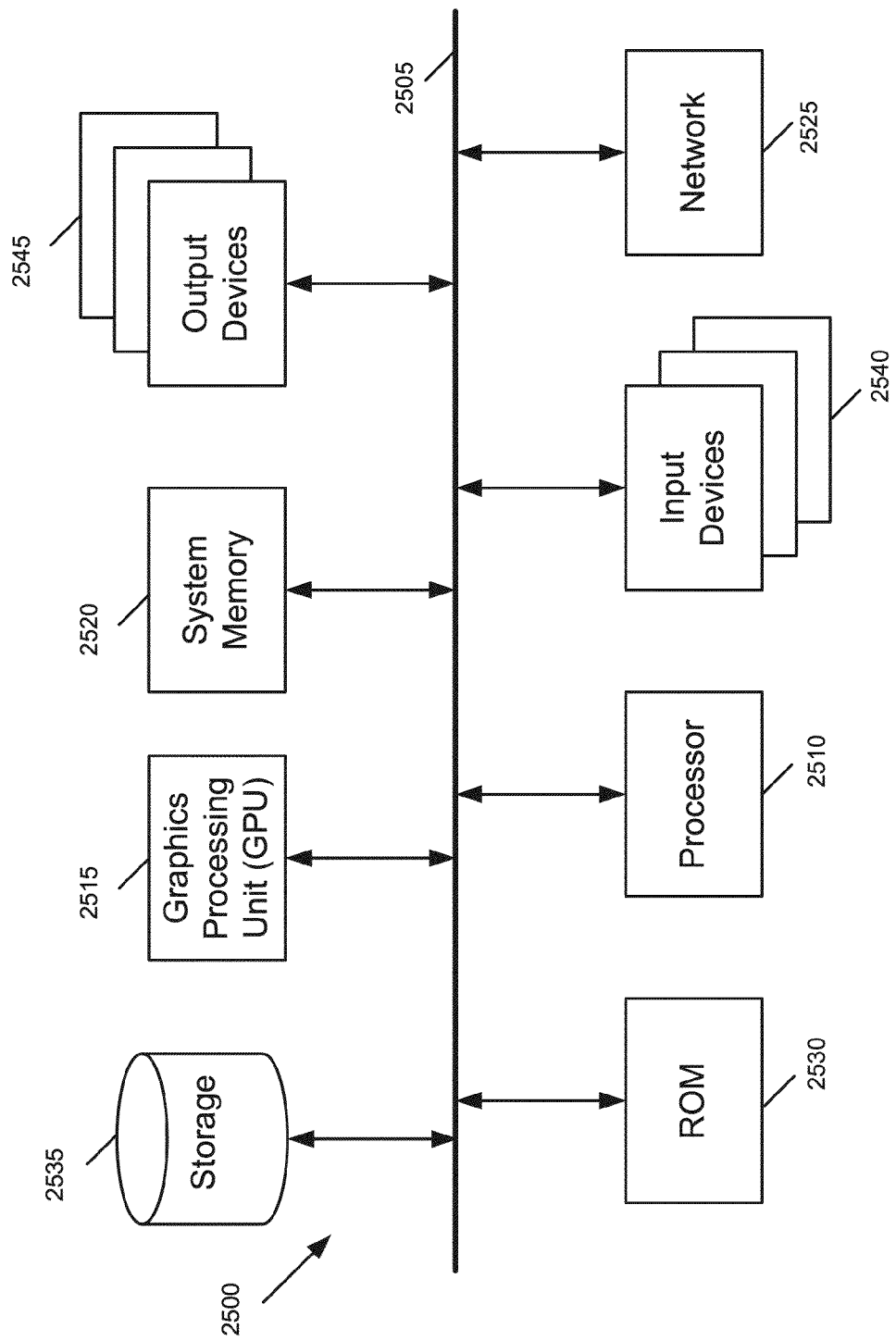
FIG. 25 illustrates an electronic system with which some embodiments of the invention are implemented.

FIG. 25 conceptually illustrates an electronic system 2500 with which some embodiments of the invention are implemented. The electronic system 2500 may be a computer (e.g., a desktop computer, personal computer, tablet computer, etc.), phone (e.g., smart phone), PDA, or any other sort of electronic device. Such an electronic system includes various types of computer readable media and interfaces for various other types of computer readable media. Electronic system 2500 includes a bus 2505, processing unit(s) 2510, a graphics processing unit (GPU) 2515, a system memory 2520, a network 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the GPU 2515, the system memory 2520, and the permanent storage device 2535.

From these various memory units, the processing unit(s) 2510 retrieves instructions to execute and data to process in order to execute the processes of the invention. The processing unit(s) may be a single processor or a multi-core processor in different embodiments. Some instructions are passed to and executed by the GPU 2515. The GPU 2515 can offload various computations or complement the image processing provided by the processing unit(s) 2510.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash memory device, its corresponding disk drive, etc.) as the permanent storage device. Like the permanent storage device 2535, the system memory 2520 is a read-and-write memory device. However, unlike storage device 2535, the system memory 2520 is a volatile read-and-write memory, such as a random access memory. The system memory 2520 stores some of the instructions and data that the processor needs at runtime. In some embodiments, the invention's processes are stored in the system memory 2520, the permanent storage device 2535, and/or the read-only memory 2530. For example, the various memory units include instructions for processing multimedia clips in accordance with some embodiments. From these various memory units, the processing unit(s) 2510 retrieves instructions to execute and data to process in order to execute the processes of some embodiments.

The bus 2505 also connects to the input and output devices 2540 and 2545. The input devices 2540 enable the user to communicate information and select commands to the electronic system. The input devices 2540 include alphanumeric keyboards and pointing devices (also called "cursor control devices"), cameras (e.g., webcams), microphones or similar devices for receiving voice commands, etc. The output devices 2545 display images generated by the electronic system or otherwise output data. The output devices 2545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 25, bus 2505 also couples electronic system 2500 to a network 2525 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 10, 15, 16, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In addition, some embodiments execute software stored in programmable logic devices (PLDs), ROM, or RAM devices.

In addition, many of the user interface controls described above relates to controlling audio. However, one of ordinary skill in the art would recognize that similar controls can be provided for image effect or filters. For example, one or more user interface controls (e.g., sliders, knobs, buttons) can be provided for each metadata tag to control the effect settings (e.g., brightness, sharpness, amount of distortion, fade-in effect, fade-out effect, etc.).

In many of the examples described herein, a media editing application uses metadata to facilitate editing operations. However, one of ordinary skill in the art would recognize that the metadata features can be provided for different types of applications or programs (e.g., an image organizing application, a server-side web application, an operating system framework). For instance, the metadata features can be provided in an image application that allows the application's user to associate different items with keywords, and apply one or more effects to those items based on the association of the keywords, and/or output those items to different tracks (e.g., files, channels) based on the association of the keywords. Thus, one of ordinary skill in the art would understand that the invention is not to be limited by the foregoing illustrative details, but rather is to be defined by the appended claims.

What is claimed is:

1. A non-transitory machine readable medium storing a program for applying effects to a composite presentation comprising a plurality of media clips, the program for execution by at least one processing unit, the program comprising sets of instructions for:

associating a set of effects with each tag of a plurality of tags, wherein at least two tags of the plurality of tags are associated with different sets of effects;

assigning the plurality of tags to media clips of the plurality of media clips; and in response to a request to output the composite presentation, for each particular tag of the plurality of tags:
  identifying a set of media clips of the plurality of media clips to which the particular tag is assigned;
  identifying the set of effects associated with the particular tag; and
  applying the identified set of effects associated with the particular tag to each media clip in the identified set of media clips in order to output the composite presentation, such that a same set of effects is applied to any two media clips that are assigned the same particular tag.

2. The non-transitory machine readable medium of claim 1, wherein the set of instructions for associating a set of effects with each tag comprises a set of instructions for associating an effect chain with at least one tag, the effect chain comprising a series of effects that is applied in sequence to each media clip that is tagged with the associated tag.

3. The non-transitory machine readable medium of claim 1, wherein for at least one tag of the plurality of tags, the identified set of media clips comprises audio data, wherein the set of instructions for applying the identified set of effects to each media clip in the identified set of media clips comprises sets of instructions for:
  routing a composite audio signal of one or more media clips in the identified set of media clips over an auxiliary bus using a send operation;
  applying one or more effects to the composite audio signal; and
  returning a processed audio signal with the one or more effects.

4. The non-transitory machine readable medium of claim 3, wherein the set of instructions for applying the identified set of effects to each media clip in the identified set of media clips further comprises a set of instructions for combining the processed audio signal with the audio signal of the one or more media clips in the identified set of media clips.

5. The non-transitory machine readable medium of claim 3, wherein the identified set of effects for a first tag comprises a first type of effect and the identified set of effects for a second tag comprises a second type of effect, wherein the set of instructions for applying the identified set of effects to each media clip in the identified set of media clips further comprises a set of instructions for applying the first type of effect using the send operation and applying the second type of effect as an insert effect, wherein the insert effect is applied to an audio signal of an individual media clip instead of a composite audio signal of multiple media clips.

6. The non-transitory machine readable medium of claim 1, wherein for at least one tag of the plurality of tags, the identified set of media clips comprises audio data, wherein the set of instructions for applying the identified set of effects to each media clip in the identified set of media clips comprises a set of instructions for applying the identified set of effects as a set of insert effects, wherein each insert effect is applied to an audio signal of the media clip instead of a composite audio signal of multiple clips in the identified set of media clips.

7. The non-transitory machine readable medium of claim 1, wherein the program further comprises a set of instructions for specifying properties or settings for one or more effects of the sets of effects.

8. The non-transitory machine readable medium of claim 1, wherein one or more effects of the sets of effects are audio effects comprising at least one of a reverb effect, an echo effect, an equalizer, and a compressor.

9. The non-transitory machine readable medium of claim 1, wherein one or more effects of the sets of effects are video effects comprising at least one of a color filter, a sharpen filter, a distort filter, a blur filter, and a video transition.

10. The non-transitory machine readable medium of claim 1, wherein for at least one tag of the plurality of tags, the identified set of media clips comprises at least one compound clip that contains multiple different inner clips.

11. The non-transitory machine readable medium of claim 1, wherein the set of instructions for assigning the plurality of tags to media clips comprises sets of instructions for:
  displaying a list of keywords for the media clips;
  receiving user input to identify a set of the keywords for the media clips; and
  assigning a set of tags associated with the identified set of keywords to the media clips.

12. The non-transitory machine readable medium of claim 1, wherein the set of instructions for assigning the plurality of tags to media clips comprises sets of instructions for automatically assigning a set of tags to a particular media clip based on properties of the particular media clip.

13. A non-transitory machine readable medium storing a program for applying effects to a composite presentation comprising a plurality of media clips, the program for execution by at least one processing unit, the program comprising sets of instructions for:
  associating a plurality of first effects with a first tag and a different plurality of second effects with a second tag;
  assigning the first tag to each media clip in a first set of media clips of the composite presentation, the first set of media clips comprising at least one compound clip that contains multiple different inner clips;
  assigning the second tag to each media clip in a second set of media clips of the composite presentation, where the first and second tags associate each media clip of the first and second sets, respectively, with the first and second effects;
  in response to a request to generate an output of the composite presentation, identifying a set of effects, including the first and second effects, to apply to the media clips of the composite presentation based on different tags associated with the media clips; and
  based on the identification, applying the plurality of first effects to the first set of media clips and the plurality of second effects to the second set of media clips in order to output the composite presentation based on the association of the pluralities of effects with the different tags, wherein applying the plurality of first effects to the first set of media clips comprises identifying each tag of the compound clip and the compound clip's inner clips, and determining, based on the identification, whether to apply a particular plurality of effects to the compound clip or one or more of the compound clip's inner clips.

14. A method for applying effects to a composite presentation comprising a plurality of media clips, the method comprising:
  associating a set of effects with each tag of a plurality of tags, wherein at least two tags of the plurality of tags are associated with different sets of effects;
  assigning the plurality of tags to media clips of the plurality of media clips; and
  in response to a request to output the composite presentation, for each particular media clip of the plurality of media clips:
    identifying a set of tags of the plurality of tags assigned to the particular media clip;

identifying the sets of effects associated with the identified set of tags; and applying the identified sets of effects to the particular media clip in order to output the composite presentation such that a same set of effects is applied to any two media clips that are assigned the same particular tag.

15. The method of claim 14, wherein associating a set of effects with each tag comprises associating an effect chain with at least one tag, the effect chain comprising a series of effects that is applied in sequence to each media clip that is tagged with the associated tag.

16. The method of claim 14, wherein a set of media clips of the plurality of media clips comprises audio data, wherein applying the identified sets of effects to media clips of the set of media clips comprises routing a composite audio signal of one or more media clips in the set of media clips over an auxiliary bus using a send operation, applying one or more effects to the composite audio signal, and returning a processed audio signal with the one or more effects.

17. The method of claim 16, wherein applying the identified sets of effects to media clips of the set of media clips further comprises combining the processed audio signal with the audio signal of the one or more media clips in the set of media clips.

18. The method of claim 14, wherein the identified set of effects for a first tag comprises a first type of effect and the identified set of effects for a second tag comprises a second type of effect, wherein applying the identified sets of effects to the particular media clip comprises applying the first type of effect using a send operation and applying the second type of effect as an insert effect, wherein the insert effect is applied to an audio signal of an individual media clip instead of a composite audio signal of multiple media clips.

19. The method of claim 14, wherein a set of media clips of the plurality of media clips comprises audio data, wherein applying the identified sets of effects to the media clips of the set of media clips comprises applying at least one effect of the sets of effects as a set of insert effects, wherein each insert effect is applied to an audio signal of the media clip instead of a composite audio signal of multiple clips in the set of media clips.

20. The method of claim 14 further comprising specifying properties or settings for one or more effects of the sets of effects.

* * * * *